United States Patent

[11] 3,557,955

[72] Inventors Gene Hirs
Birmingham;
Richard H. Wykoff, Livonia, Mich.
[21] Appl. No. 696,624
[22] Filed Jan. 9, 1968
[45] Patented Jan. 26, 1971
[73] Assignee Hydromation Engineering Company
Livonia, Mich.
a corporation of Michigan
Continuation-in-part of application Ser. No. 671,903, July 26, 1967, now abandoned, and a continuation-in-part of 681,391, Nov. 8, 1967, now abandoned, and a continuation-in-part of 552,736, May 25, 1966, now abandoned.

[54] METHOD OF AND APPARATUS FOR FILTERING
26 Claims, 16 Drawing Figs.

[52] U.S. Cl. ................................................ 210/67,
210/80, 210/82, 210/276, 210/279, 210/280, 210/500
[51] Int. Cl. .................................................... B01d 27/74, B01d 39/04
[50] Field of Search ........................................ 210/67, 80, 81, 82, 270, 276, 279, 280, 300

[56] References Cited
UNITED STATES PATENTS

| | | | |
|---|---|---|---|
| 2,612,966 | 10/1952 | Nicol | 210/500X |
| 3,190,452 | 6/1965 | Martin | 210/279X |
| 3,276,590 | 10/1966 | Schmid et al. | 210/80X |
| 3,384,240 | 5/1968 | Berardi | 210/279X |
| 3,424,674 | 1/1969 | Webber | 210/80X |
| 2,965,445 | 12/1960 | Joens et al. | 210/20X |
| 3,179,603 | 4/1963 | Edwards et al. | 210/20X |
| 3,424,674 | 1/1969 | Webber | 210/20 |

FOREIGN PATENTS

| | | |
|---|---|---|
| 1,146,864 | 11/1957 | France |
| 227,707 | 1/1925 | Great Britain |

*Primary Examiner*—John Adee
*Attorney*—Cullen, Settle, Sloman & Cantor

ABSTRACT: The invention provides a method of and apparatus for filtering which provides the filtering of extremely small particles, greater dirt retention in the filter medium, higher flow rates through the filter medium, a smaller volume of filter medium, and improved backflushing or backwashing to obtain a cleaner medium. The medium is composed of finely divided particulate material which in the preferred embodiment is polyvinyl chloride, polyethylene or wood sawdust, these materials being light and having great strength to provide stable, fine particles capable of being backflushed. While the apparatus can assume many different configurations, liquid permeable retainers preferably are provided at both the inlet and outlet sides of the filter medium. Where the filter medium is located between retainers, it is important to reverse the liquid flow at least through the inlet retainer during backflushing to remove any deposits from that retainer. As will be described, it is possible to use only one liquid permeable retainer together with agitation and hydraulic flow during backflushing to provide a simplified filter which is effective in some applications. The invention also features backflushing of a particulate filter medium which is very compact and contains relatively great dirt loads. Such backflushing utilizes both mechanical and hydraulic forces, and may be accomplished in several different ways. The media can be compacted, if desired, to reduce the size of the voids therein, thereby increasing the effectiveness of the filter medium in entrapping and holding extremely small particles of dirt therein. The filter medium is compacted prior to the filtration operation, such compaction being accomplished in any one of several ways, e.g. by the use of fluid pressure or a differential flow rate.

INVENTORS
GENE HIRS.
BY RICHARD H. WYKOFF
SETTLE, BATCHELDER & OLTMAN.
ATT'YS.

INVENTORS
GENE HIRS.
BY RICHARD H. WYKOFF
SETTLE, BATCHELDER & OLTMAN.
ATT'YS.

INVENTORS
GENE HIRS.
BY RICHARD H. WYKOFF
SETTLE, BATCHELDER & OLTMAN.
ATT'YS.

METHOD OF AND APPARATUS FOR FILTERING

REFERENCE TO RELATED APPLICATIONS

This application is a continuation of the earlier filed patent application of Gene Hirs, Ser. No. 671,903, filed in the United States Patent Office on July 26, 1967 and Ser. No. 681,391, filed in the United States Patent Office on Nov. 8, 1967 both now abandoned.

Also, this application is a continuation-in-part of a copending application Ser. No. 552,736, filed on May 25, 1966, now abandoned in the name of Gene Hirs and Richard H. Wykoff. All of said applications are assigned to the assignee of the present invention.

BACKGROUND OF THE INVENTION

Deep bed filters which are available commercially at the present time operate by filtration through a fairly porous medium, such as sand or anthracite having particle diameters in the range of about 0.5 to 0.8 millimeters. With such particles, a fairly deep bed is required for effective filtration, and there is considerable volume of filter medium for each square foot of exposed filter area. For example, in a typical bed there may be 3 feet of coarse anthracite above a 3-foot intermediate bed of sand and a 1 foot bed of gravel beneath the sand. Such a filter medium thus requires 7 cubic feet of volume for each square foot of exposed filter area. It is evident that the filter equipment required for providing such a deep bed must be bulky, requires elaborate support structures, is necessarily expensive and is difficult to clean for reuse simply because of the large volume and weight of the composite filter medium. When using sand or the like as the filter medium, a compromise must always be made between high flow rate or fine particle removal, or between high dirt loading and either flow rate or fine particle removal. Thus, it has proved impossible heretofore to obtain, concurrently, high flow rates, fine particle removal and the retention of large amounts of dirt.

It is desirable to have large area in a filter medium rather than extreme depths. It now has been found that particles utilized as herein taught and finer than the generally accepted sizes for deep bed filters make it possible to greatly reduce the volume of the filter medium and still achieve the same or even better filtration results. For example, a filter according to this invention may have a filter medium made up of particles of diameters in the range of 0.2 to 0.71 millimeters. The average size of the particles is in the range from 25—70 U.S. sieve number. With this material properly contained in a cartridge, a 6 to 12-inch bed of the material gives filtration equivalent to a 7 foot bed of anthracite, sand and gravel as discussed above. From one-half cubic foot to 1 cubic foot of the finer medium gives 1 square foot of filter area, so a volume that is one-fourteenth to one-seventeenth that of the 7 foot bed gives the same filtration result. Thus, the present invention clearly makes it possible to build effective filtration volume, rather than extreme depths, into what is commonly known as a "deep bed" filter.

If the average size of the particles is half of the size that is normally used in deep bed filtration, the filter medium has four times the exposed surface area, since areas are normally a square function. The finer medium also has smaller passageways and many more dirt spaces, and the medium particles provide far more tortuous paths for the liquid to follow. Thus, the overall filtration efficiency is greatly enhanced.

If a known filter medium material such as anthracite or sand, is used to provide the finely divided particulate filter medium for the filter as described above, it has been found that the entrapped dirt load and also the flow rate of contaminated liquid through the filter medium are somewhat limited compared to the results which are desired. For this reason, investigation of new particulate materials for filter media has been undertaken, and certain filter medium materials have been found which are capable of retaining a substantially higher dirt load per cubic foot of filter medium, without "bleed through" even at higher flow rates of contaminated liquid, than has been retained with previously utilized materials. These new filter medium materials will be described later herein. One of the reasons these materials are so desirable is they provide a filter medium of great porosity; that is, there is an unusually great number of voids in the filter medium. However, if these voids are relatively large in size, they will not entrap fine dirt particles as effectively as would smaller voids. The present invention also proposes the reduction of the size of at least some of the voids in the particulate filter medium herein utilized.

The high dirt loads obtained with the filter media described herein pose another problem. It is necessary to backflush or backwash the filter medium periodically to wash the small dirt particles out of the voids in which they have been entrapped. Conventional backwashing techniques are not satisfactory. Typically, backwashing of a filter medium, such as sand, is presently carried out by merely flowing backwash liquid through the filter medium in a direction the reverse of that in which the liquid flows during filtration. A medium, such as sand, is fairly heavy, and so does not completely intermingle and turn over during backflushing. The cake which builds up on the filter medium during filtration simply expends during backflushing, and the medium particles move relative to one another and relative to the dirt only to a limited extent. The medium cannot be flushed out of the filter casing and transferred to an external processing tank because it is too heavy to be put into a slurry and to be transferred to the external receptacle. Also, a relatively large amount of backwashing liquid is required to flush out the filter medium. It would be desirable to provide a backwashing system and method which sufficiently agitates the dirt and the medium to put both the medium and the dirt into a slurry, thus completely intermingling the particles and turning over the filter medium completely, so as to wash all or very nearly all of the dirt particles out of the voids in which they have been entrapped. For this purpose, the filter medium material must be light and durable, so that it may easily be put into a slurry. Further, such a slurry could be transferred to an external backflush tank, if desired.

A cartridge that will contain the particulate filter medium must have a liquid permeable retention member on at least one side of the filter medium that is generally smaller in pore size than the particles of the medium, so as to prevent the medium from flowing into the inlet or outlet both. As will be described herein, the reusable deep bed cartridge of the invention preferably has retention members both at the inlet side and the outlet side of the filter medium. It is important to make these retention members strong to withstand the pressures which will be exerted upon them, and at the same time make them sufficiently inexpensive as to be practical. Also, it is desirable to construct the retainer element in such a way to increase the dirt holding capacity of the filter medium by increasing the total area in which dirt can be captured most effectively. Such retainer elements will be described and claimed herein.

SUMMARY OF THE INVENTION

The present invention now provides a new and novel apparatus for and method of filtering to remove particulate impurities from a liquid with unprecedented effectiveness, whether this effectiveness is expressed in terms of size of particles removed, flow rate and dirt load. Actually, all three measures of effectiveness are obtained by the utilization of this invention at the same time, and it is this combination of properties and/or capabilities which yields unexpected and synergistic results.

For example, it has never before been possible to remove particles of an average size range of up to 50 microns at a flow rate of at least 6 gallons per minute per square foot of medium area and to retain without bleed through at least 5 cubic inches of such particles or about 0.5 pounds of calcium carbonate particles in a size range of from 0.1 to 0.35 microns or about 2 pounds of ferric oxide particles. Actually, these capabilities are the minimums, e.g., the size of calcium carbonate particles removed ranges down to 0.1 micron in size, and flow rates of up to 30 gallons per minute per square foot have been obtained, while as much as 4.5 pounds of ferric oxide per cubic foot of medium which has been retained without bleed through.

All specific numerical values for particle size, flow rate and dirt loading as herein utilized are comparative and are based on the utilization of calcium carbonate as the test contaminant suspended in water, the calcium carbonate having an average particles size 0.1 to 0.35 microns, and the medium having an average particles size of 25 to 45 mesh. Of course, this invention contemplates the use of larger medium particles where this fine degree of dirt particle removal is not necessary. Also, the dirt loading in terms of pounds of dirt per cubic foot of medium will vary with the density of the dirt removed. This is the reason for defining the dirt loading in terms of cubic inches of dirt per cubic foot of medium. The flow rate will vary with the liquid being filtered. All of these factors, and the comparative nature of the numerical values herein set forth must be considered in determining the scope of the present invention.

The method and apparatus of the invention require the backflushing of the particulate filter medium in compacted form and containing relatively great dirt loads. As will be described herein, by compacting the filter medium in a prefiltering compaction operation, and also by having a finer filter medium than is typically used in deep bed filters, more dirt can be held in the filter medium. However, this also results in a denser filter medium after filtration which is much more difficult to break up and clean than is the medium of conventional deep bed filters. The medium can be broken up, however, by utilizing a combination of mechanical and hydraulic forces during backflushing, and in this manner the filter medium is put into a slurry and agitated to completely intermingle the particles of the filter medium and to turn the filter medium over, thus removing dirt which has been entrapped in the filter medium. Five modes of backflushing in accordance with the invention are herein disclosed and these modes are:

1. Moving perforate headers embedded in the filter medium while distributing liquid throughout the filter medium by flow through the headers;
2. stationary jets at different levels within the filter medium;
3. mechanical agitators embedded in the filter medium combined with liquid flow;
4. transfer of the filter medium to an external receptacle, backflushing of the filter medium and agitating it in the receptacle, and transfer of the filter medium back to the filter casing;
5. a combination of air flow and liquid flow into the filter medium.

Another feature of the invention is the nature of the particulate filter medium. The medium is composed of finely divided particulate material which in the preferred embodiment is polyvinyl chloride, polyethylene or wood sawdust. One important attribute of these materials is that they are light and are relatively strong, and this means that they can be put into a slurry during backflushing more easily than conventional materials, such as sand. Also, the strength of the materials enables them to withstand the agitation encountered during backflushing without breaking up or degrading into smaller and smaller particles. With a light medium, such as the plastic or wood sawdust materials, less liquid is required during backflushing to thoroughly clean the filter medium.

Another important aspect of the polyvinyl chloride, polyethylene and wood sawdust media is that they can be compacted to reduce the size of the voids therein, so that smaller dirt particles can be removed by the filter medium than has been possible with conventional media such as sand. Sand is very difficult to compress or compact, and thus its capacity for removing fine dirt is limited. Several different modes of compacting the filter medium have been developed, and these modes (which are illustrated and described herein) may be summarized as follows:

1. Compaction and filtering by the use of two pumps;
2. Compaction and filtering by the use of one pump plus air pressure;
3. Compaction and filtering by supplying liquid to different areas of the filter medium;
4. Compaction and filtering by the use of one pump cooperating with outlets of different sizes to alter the flow rate between compaction and filtering.

As has been previously pointed out, liquid permeable retainers are preferably provided at both the inlet and outlet sides of the filter medium. As will be further explained later, the retainers at the inlet side of the filter medium may be in the form of tubes spaced around the periphery of the filter medium, and this arrangement results in a relatively large area of filter medium in which most of the dirt is held, thus increasing the dirt loading capacity of the filter medium. The use of retainers at both the inlet and the outlet sides of the filter medium also results in a minimum loss of filter medium during backflushing, and this, of course, is an important advantage. However, it is possible to use only liquid permeable retainer underneath and supporting the filter medium, with the top of the filter medium being unconfined. An agitator is embedded in the filter medium and is operated together with hydraulic flow during backflushing, thus providing a simplified filter which is effective in some applications. However, a disadvantage of this arrangement, as compared to the use of retainers at both the inlet and outlet sides of the filter medium, is that some of the medium may be lost during backflushing. Also, the medium may not break up uniformly. This approach does have the advantage, however, that since there is no inlet retainer, there is no plugging of the inlet retainer due to dirt depositing in the openings of the retainer during filtering. If inlet screens are used, and if they were to become plugged at the beginning of the filtering cycle, pressure would build up and the flow would never go through the filter medium. This problem can be largely avoided, however, by reversing the inlet flow at least through the inlet retainer during backflushing to remove any deposits from the retainer. In summary, the following disclosure provides four ways in which the medium can be preferably confined:

1. Confinement of the filter medium between screens, e.g., of annular shape.
2. Confinement of the filter medium between wedge wire elements.
3. Confinement of the filter medium within a foraminous cartridge of plastic sheets or the like.
4. Placement of the filter medium between wedge wire or other perforate tubes.

Accordingly, it is an object of the present invention to provide a filter with a particulate filter medium which can hold a relatively great amount of dirt of small particle size while accommodating high flow rates.

Another object of the invention is to provide a filter with a backflushing system and method which efficiently removes dirt from a compacted particulate filter medium containing relatively great dirt loads.

A further object of the invention is to provide a filter with a backflushing system and method which efficiently removes dirt from a compacted particulate filter medium containing relatively great dirt loads.

A further object of the invention is to provide a filter with a backflushing system and method capable of cleaning a particulate filter medium which is very compact by breaking up the filter medium, putting it into a slurry, and completely intermingling and turning over the particles of the filter medium while in the slurry to remove previously filtered dirt.

A yet further object of the invention is to improve the efficiency of a particulate filter medium in the removal of extremely fine particles by compressing the medium prior to filtration to reduce the size of the voids in the filter medium and thus increase the dirt removing capability of the medium.

This invention has as another object of the provision of a renewable deep bed filter of enhanced filtering capacity and yet which requires less volume of filter medium per square foot of filter area than known filters.

Yet another, and more specific, object of the invention is to provide a filter apparatus and method wherein a filter medium is provided with backflush headers embedded in the filter medium, and foraminous retainers are provided at the inlet and outlet sides of the filter medium, the retainers being in the form of perforate tubes embedded in the filter medium.

Other objects of this invention will appear in the following description and appended claims, reference being had to the accompanying drawings forming a part of this specification, wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

COMPACTION

Figure 1:
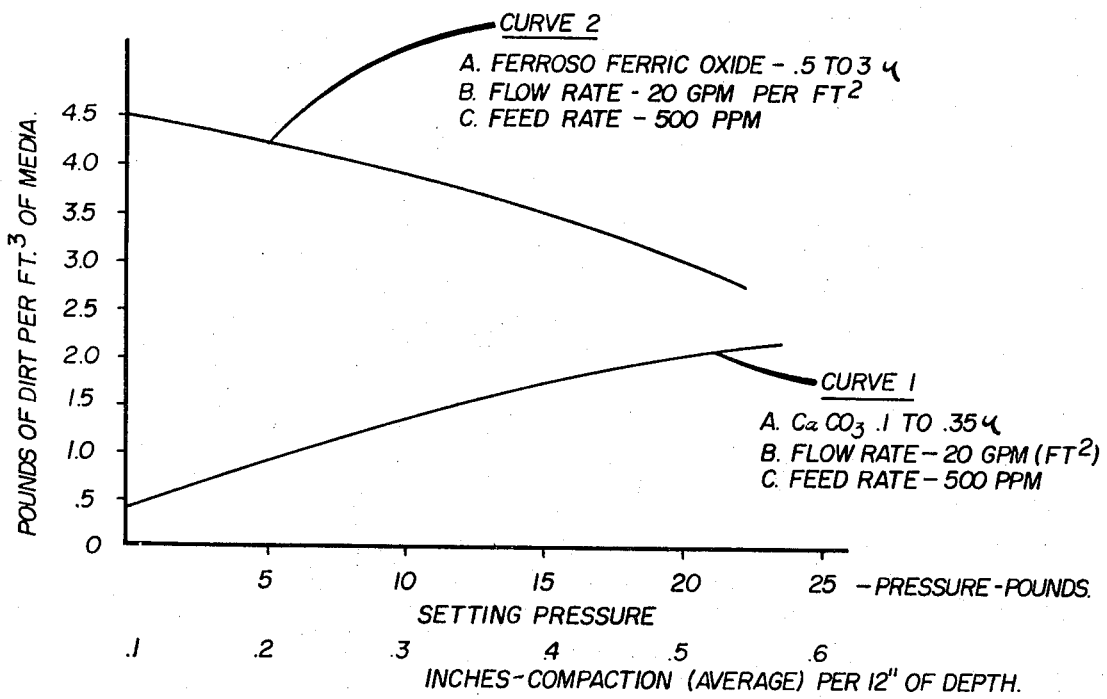
FIG. 1 is a plot of dirt retention against degree of compaction, illustrating the effect of initial compaction on the retention of dirt of two different particle sizes.

In FIG. 1, there is illustrated a set of curves illustrating several important aspects of the present invention. In each case, the degree of compaction (measured in terms of both liquid pressure and in inches of compression) is plotted against the dirt load at the point of bleed through (the dirt load being measured in terms of pounds of dirt per cubic foot of medium).

It will be noted that the dirt load increases in proportion to the degree of compaction when the dirt removed is relatively small, i.e. calcium carbonate having a particle size of 0.1 to 0.35 microns; but the dirt load decreases in proportion to the degree of compaction when the dirt removed is relatively large, i.e. ferric oxide having a particle size of 0.5 to 3 microns. In each instance, the filter medium was polyvinyl chloride having an average mesh size of 35—50 mesh.

Thus, the desirability of compaction is related to the size of the particles being filtered. Further, the dirt load is proportional to the particle size and density of the particles being filtered.

Figure 1A:
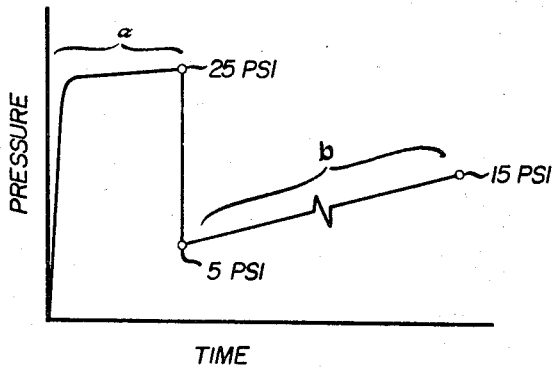
FIG. 1a is a plot of pressure versus time illustrating how a particulate filter medium is compressed at high pressure and filtration is carried out at lower pressures.

As has been pointed out, it has been found that if a compactible filter medium material is used in a filter in accordance with the invention, a substantial increase in the amount of small particles of dirt that can be held by the filter medium can be achieved by first compressing and compacting the filter medium and subsequently carrying out the filtration operation. This principle is applied in all of the embodiments to be illustrated and described herein, and the plot of FIG. 1a shows generally how the principle works. This is a plot of pressure versus time as liquid flows through a particulate filter medium in accordance with the invention. Portion a of the curve shows that during an initial period of time liquid flows through the filter medium at a high pressure which is indicated in FIG. 1 to be in the vicinity of 25 pounds per square inch. During this portion of the cycle, the high pressure exerted on the filter medium causes it to compress or compact so as to reduce the size of the voids in the filter medium. The purpose of this compaction will be explained further, but it may be noted at this point that after compaction the filter medium is capable of holding more dirt. After compaction, the pressure on the filter medium is lowered to a substantially lower pressure, such as 5 pounds per square inch as indicated in FIG. 1, and contaminated liquid is passed through the filter medium for an extended period of time indicated as portion b of the curve in FIG. 1. The curve is shown broken in the middle of portion b indicating that filtration occurs for a longer period of time than might be indicated by comparison of the length of portions b and a. During portion b of the curve, the pressure builds up gradually, and filtration ceases when the pressure reaches a predetermined maximum which is indicated, typically, as 15 pounds per square inch.

THE FILTER MEDIUM

In one embodiment, the filter medium is finely divided polyvinyl chloride material, and this material is an example of a family of polymer materials which may be used for the filter medium. The general family of particulate polymers suitable for this polymeric filter medium has a specific gravity of less than 1.55, an average particle size in the range from 0.25 to 0.71 millimeters (or an average particle size in the range from 25—60 in U.S. sieve number), and a porosity in the range from about 55 percent to 80 percent.

As has been pointed out previously, the high porosity of the polyvinyl chloride material gives the filter medium a relatively great capacity for retaining dirt or sludge. The relatively fine particle size of the material makes it possible to provide a filter medium with less volume than known deep bed filters as described in the aforementioned copending application. The depth of the filter medium may be from 6 to 18 inches, and a typical depth for the filter medium is 12 inches.

Also, as pointed out above, the preferred polyvinyl chloride material has a relatively low specific gravity, about 1.4 to 1.5, and weighs only about 25 pounds per cubic foot. This makes the polyvinyl chloride material relatively light and means that it can easily be put into a slurry and mixed and scrubbed so that the particles can be backwashed easily. The cartridge filter has backwash headers as will be described, and it is very important to be able to backwash the filter medium easily to be sure that all dirt retained in the material is removed during backwashing. It has been found that the polyvinyl chloride filter medium can be backwashed at about one-half of the rate required for backwashing sand. Once put into a slurry, the particles of polyvinyl chloride separate and the breakthrough velocity or the backflush velocity has to be relatively small in order to achieve an efficient cleaning of the filter medium.

Since the polymer filter medium is light, it is desirable to confine the filter medium between retention members in order to hold the filter medium in place during backwashing. Otherwise, some of the filter medium might be washed away during backwashing. The space between the retainer members may be a little larger than the uncompacted volume of the filter medium to allow the particles to separate and undergo mixing and scrubbing action during backwashing.

It has also been found that the polyvinyl chloride filter medium can retain much more dirt than sand, and it has been shown that this result is related to the effective porosity of the materials. It is well to repeat that a typical porosity for sand is 40 percent whereas a typical porosity for polyvinyl chloride is 60 percent, and consequently the polyvinyl chloride has about 1.65 times the absolute porosity of the sand. However, blind or closed pores or passages are not effective for either liquid flow or filtration. For some reason, there appears to be many more effective voids or pores in polyvinyl chloride than would appear from the mere difference in porosity. It is believed that this explains why the polyvinyl chloride material can retain so much more dirt than a sand filter medium.

The toughness of the polyvinyl chloride material has also been mentioned, and this is important because it means that the particles of the filter medium will not break down into smaller particles during backwashing. The mixing and scrubbing action which is created during backwashing subjects the particles to impact and erosion forces which tend to disintegrate them, but the polyvinyl chloride material is strong enough to withstand this action without breaking down into smaller particles. Obviously, it is not desirable to be continuously generating smaller and smaller particles as the filter medium is backwashed periodically.

Particulate polyethylene material is another example of a polymeric filter medium in accordance with the invention. The preferred polyethylene material has the properties set forth previously, i.e. a specific gravity of less than 1.55, an average particle size in the range from 0.25 to 0.71 millimeters (or an average particle size in the range from 25—60 U.S. sieve number), and a porosity in the range from 60 percent to 80 percent. The polyethylene material has a specific gravity of about 0.95 to 0.96, and a bulk density of about 21 to 23 pounds per cubic foot. Thus, it is relatively light so that it can be put into a slurry and mixed and scrubbed easily during backwashing. The polyethylene material is also tough enough to withstand backwashing without breaking down into smaller and smaller particles.

It has been found in laboratory tests that the polyethylene particles will retain considerably more dirt than even polyvinyl chloride particles. A significant difference between the polyethylene particles and the polyvinyl chloride particles is that the polyethylene particles have a wide variety of shapes whereas the polyvinyl chloride particles have a more uniform shape. Polyvinyl chloride particles are grown to size in an emulsion, and they are spherical or oval shaped with a pockmarked surface something like cauliflower or popcorn. Polyethylene particles having the properties set forth above are prepared by shredding larger particles, such as ¼-inch cubes, with knives or a grinder. The resulting particles are of the nature of shavings, and the predominant shape is elongated, i.e. pencillike, stringlike and needlelike. However, there are also other particle shapes such as angular, oval and other dissimilar shapes. Almost all polyethylene particles of the preferred type appear to have different shapes. It is believed that as a result of this variety of shapes, some of the particles partially fill voids between other particles so that a polyethylene filter medium has a large percentage of voids, and further, the voids are small and provide more effective labyrinth passageways for dirt to catch in the filter medium.

For a filter medium, both the polyvinyl chloride particles and the polyethylene particles have an average size in the range from 0.25 millimeters to 0.71 millimeters. However, the distribution of sizes is also important and this may be expressed in terms of the uniformity coefficient of the medium. The uniformity coefficient of a particulate filter medium is obtained as follows. The effective size of the particles is measured by screening, and this is the size in millimeters than which 10 percent by weight of the particles is finer and 90 percent by weight of the particles is coarser. Another size in millimeters is measured by screening than which 60 percent of the particles by weight is finer and 40 percent by weight of the particles is coarser. The latter size divided by the effective size is the uniformity coefficient. The more uniform the size of the particles, the closer the uniformity coefficient is to unity.

The uniformity coefficient of the particulate polyethylene filter medium in accordance with the invention is very high, and it is believed that this is another reason why the polyethylene particles are so effective in holding dirt. The polyethylene particles have a wide variation in size as well as shape. As an example, the polyethylene medium may have a size range of from 0.177 millimeters to 0.71 millimeters.

As the uniformity coefficient of a particulate filter medium approaches unity, the size of the voids in the medium increases and the ability of the medium to remove finely divided particles decreases. It is important to have a large percentage of voids, but it is also important to make the voids small so they will catch fine particles. By using particles with a wide variation of sizes, the smaller particles will partially fill some of the voids between larger particles, thus making the resulting voids smaller. It is believed that the best results are achieved with irregularly shaped particles having a high uniformity coefficient such as the polyethylene particles described herein.

Tests have been conducted on filtering water contain calcium carbonate particles in the size range from 0.10 to 0.35 microns with a concentration of 500 parts of calcium carbonate per million. The calcium carbonate had a specific gravity of 2.65 and a packed density of 0.67. Using a 12-inch depth of polyvinyl chloride particles having the characteristics set forth above, it was found that 204 gallons of liquid per square foot of medium was passed through the medium before bleed through, with a dirt holding capacity of 0.85 pounds per cubic foot of filter medium. These results were 100 percent better than sand of an equivalent size where only 85 gallons per square foot of medium passed through the medium before a bleed-through occurred. These tests were run without initial compaction, as above described under the heading COMPACTION.

With the same conditions using a 12-inch deep filter medium of polyethylene particles as previously described and without compaction, 440 gallons per square foot of medium were filtered with a dirt holding capacity 1.83 pounds per cubic foot of filter medium. On the average, polyethylene particles retained over twice the amount of dirt that polyvinyl chloride particles retained. As has been pointed out, this result can only be attributed to the variety of shapes and sizes of particles in the polyethylene material resulting in more effective voids, longer labyrinth passageways in which dirt can catch, deeper penetration into the polyethylene medium, greater surface area, and greater molecular attraction in polyethylene as compared to polyvinyl chloride.

Both polyvinyl chloride and polyethylene were effective to filter out the very fine 0.1 to 0.35 micron particles of calcium carbonate, and both materials were considerably more effective than sand in this filtering.

A third material which has been found to form an effective filter medium for purposes of this invention is sawdust. This material is utilized in the same size ranges and porosities, but generally of lighter densities. The same advantages of slurrying during backwash, resistance to surface loading, dirt holding capacity, porosity and ability to compact, etc., are obtained by the use of sawdust.

One other aspect which must be considered is the ease of backflushing. Although exhaustive tests have not been performed, it has been found that crystalline, irregularly-shaped, essentially nonspherical polyvinyl chloride particles in the size ranges herein specified tend to interlock with one another and are difficult to separate for effective backflush. Further, the elongated and irregular polyvinyl chloride particles abrade one another during backflush, with the resultant formation of fines. Thus, essentially spherical polyvinyl chloride particles having smooth or wavy surfaces as heretofore described are greatly preferred.

So far as polyethylene and sawdust are concerned, these particles are much less dense than polyvinyl chloride, tend to float in the liquid being filtered and apparently abrade one another to a less extent, probably because of the waxy surface of the polyethylene and the platelt shape of the sawdust particles.

Such materials are "organic" in nature, being carbon compounds which are complicated synthetic or natural essentially polymeric structures, in contrast to such previously-used deep bed filter media as coal, sand and the like.

THE STRUCTURE AND FUNCTION OF THE EMBODIMENT OF FIGURES 2 THROUGH 4

Figure 2:
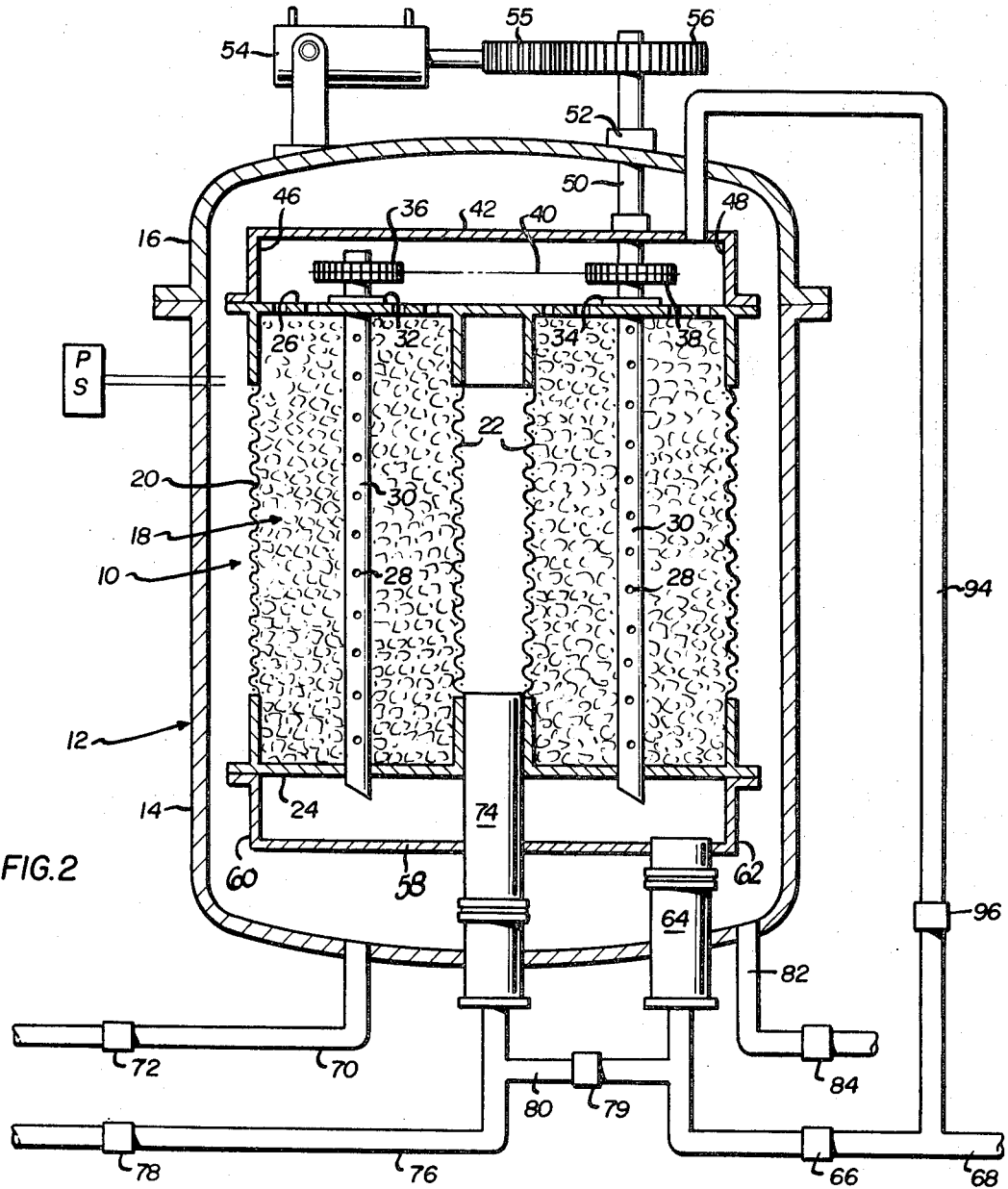
FIG. 2 is a vertical sectional view of a reusable deep bed cartridge provided in a pressure vessel according to one embodiment of the invention.

The filter cartridge 10 in FIG. 2 is provided inside a pressure vessel 12 including a bottom portion 14 and a removable dome portion 16. The cartridge 10 includes a filter medium 18 which is confined by and between two perforate retainer members 20 and 22. The retainer members in this embodiment are tubular, and they are mounted concentrically with the inner retainer member 22 inside the outer retainer member 20.

The filter media 18 is finely divided particulate material such as polyethylene, polyvinyl chloride or wood sawdust. The particles of the filter medium are very fine and preferably have an average size in the range from 25—70 U.S. sieve number. The particles may range in size from about 0.2 to about 0.71 millimeters, but it is to be noted that the particles may be nonuniform. For example, some of the particles may be long and narrow so long as the average particle size is in the range from 25—70 U.S. sieve number. Thus, the particles are finer than the sizes which are generally accepted for deep bed filters, and this means that the filter medium may have less volume than known deep bed filters as explained previously. The depth of the filter medium (that, the radial distance between the two retainer members 20 and 22) may be from 6 to 12 inches, and a typical depth for the medium is 9 inches. This medium will give the same or superior filtration results as compared to a coarser medium having a 7 foot depth of anthracite, sand and gravel, as explained previously.

The polyethylene, polyvinyl chloride or wood sawdust filter medium should preferably have a porosity in the range from 60 percent to 80 percent when in a loose, uncompacted condition, as this provides a filter medium with many voids in which dirt particles can become trapped. It has been found, however, that if the filter medium remains loose during filtering, only a fairly small percentage of the voids space is effective in capturing particles, and the void space that is not effective is too large in size to effectively capture and entrap particles.

The solution now proposed is to compress or compact the filter medium before the filtering portion of the cycle to reduce the size of the voids. The result is that higher flow rates can be used during filtration while at the same time trapping far more dirt than when an uncompacted medium is used. By way off comparison, using an uncompacted filter medium of polyvinyl chloride particles having a porosity of 60 percent to 80 percent, it has been possible to entrap 0.7 to 0.9 pounds of dirt ($CaCO_3$, 0.1 to 0.35 microns in size) per cubic foot of filter medium at a flow rate of about 10 gallons per minute per square foot of area. By first compacting the filter medium at a pressure of say 25 to 30 pounds per square inch and then filtering at a lower pressure of say 5 to 15 pounds per square inch, it has been possible to trap as much as 2 pounds of the same dirt per cubic foot of filter medium at a flow rate of about 20 gallons per minute per square foot of filter area. The same type of results can be obtained with polyethylene and wood sawdust media. However, the plastic and sawdust media are far superior to sand, because sand is very difficult to compact and is not capable of the high flow rates herein contemplated. The shape, size and compressibility of polyethylene, polyvinyl chloride and wood sawdust particles facilitates compaction thereof, and this is an advantage of such materials.

Another advantage of the polyethylene, polyvinyl chloride and wood sawdust materials is that they are light and tough so that they can be backflushed comparatively easily without breaking down into smaller and smaller particles such as would occur for example with anthracite. The particles should have a specific gravity of 1.55 or less and a bulk density of 25 to 35 lbs./ft.$^3$ to make them light enough for easy backflushing. This is particularly important where the filter medium is compacted before filtering, because a great amount of dirt is present in the used medium and this dirt load is distributed throughout the medium. In order to adequately clean the medium, it is necessary to completely turn over the filter medium by putting it into a slurry and agitating to thoroughly mix and scrub the medium, thereby separating the dirt and the medium. The dirt then can be washed out with the backwash liquid. This requires an unusually effective backwash system, as has been explained, but the lightness and toughness of the particles contributes significantly to the effectiveness of the backwashing.

Figure 3:
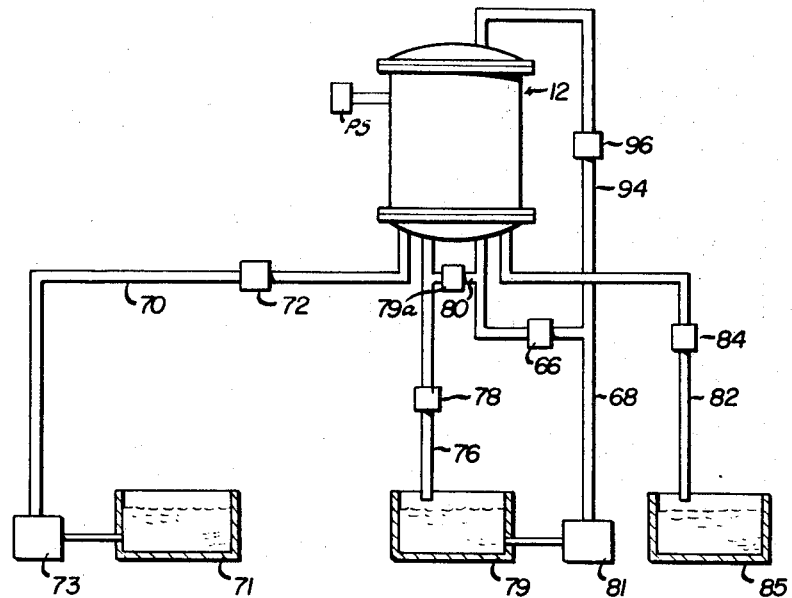
FIG. 3 is a schematic diagram of a liquid flow circuit for the cartridge of FIG. 2.
Figure 4:
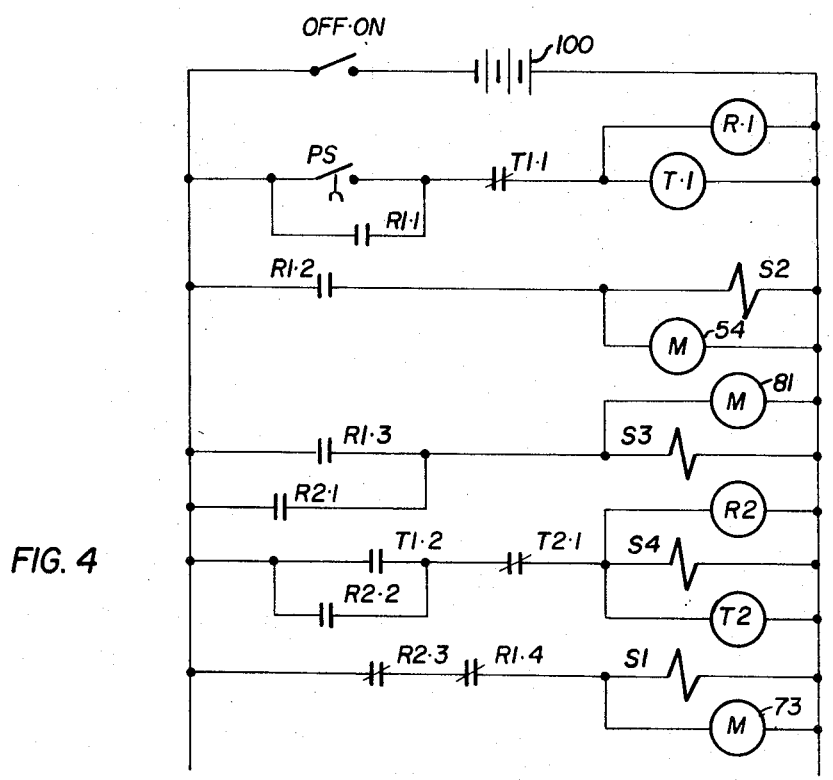
FIG. 4 is a schematic diagram of an electrical control circuit for operating the embodiment of FIGS. 2 and 3.

There are several ways to compact the filter medium at the beginning of a cycle, and the examples will be described herein. In the embodiment of FIGS. 2, 3 and 4, compaction is accomplished by flowing liquid down through the top of the filter medium (under perforate plate 26), and filtering is carried out by flowing liquid inwardly through the side of the filter medium (through retainer 20). Since the top area is smaller than the side area, the same pumping force for both compaction and filtering will produce a higher pressure on the top of the filter medium which will ram the medium downward and compact it. Flow during filtering thus takes place at right angles to flow during compaction, and this is an inexpensive way to accomplish compaction which results in a filter with a large effective area. Examples of other specific apparatus for accomplishing compaction will be described later herein.

The axial ends of the filter medium are supported by a lower solid plate 24 and an upper perforate plate 26 which, together with the retainer members 20 and 22, positively confine the filter medium. The perforations or pores through the retainer members 20 and 22 are smaller than the particles of the filter medium 18, so that the particles cannot escape through the pores of the retainer members. The retainer members 20 and 22 may be fine wire mesh or other closely woven material, such as nylon filter cloth backed up with a coarser structure for support purposes.

The cartridge also includes vertical backwash tubes or pipes 28 and 30 for distributing backwash liquid into and throughout the filter medium during a backwash portion of the cycle of operation. The backwash pipes 28 and 30 are embedded in the filter medium 18, and they are perforated so that backwash liquid can pass through the pipes and out through the openings therein into the filter medium to agitate and wash the filter medium. The cartridge should include one or more backwash pipes, and two such pipes are shown in FIG. 2.

The upper ends of the backwash pipes 28, 30 extend through the top plate 26 of the cartridge and project above the filter medium. Bushings 32 and 34 are affixed to pipes 28 and 30 and support them for rotation which helps to distribute the backwash liquid throughout the filter medium. The pipes 28 and 30 could be reciprocated, but in this embodiment they are moved rotationally. Sprockets 36 and 38 are affixed, respectively, to the upper ends of pipes 28 and 30 and there is a drive chain 40 extending around the two sprockets 36 and 38.

A top wall 42, together with end walls 46 and 48 and plate 26 forms a compartment for enclosing the upper ends of pipes 28, 30. A driving extension 50 is affixed to pipe 30 and extends upwardly through the pressure dome 16 to the exterior side thereof. A seal 52 is provided where the extension 50 passes through the pressure dome 16. A motor 54 is coupled to the upper end of the extension 50 by suitable gearing 56, and the extension 50 and the pipe 30 are rotated by operation of the motor 54. For example, the motor 54 may be a reciprocating piston and cylinder type which reciprocates a rack 55 to rotate a gear 56 which, in turn, rotates pipe 30. Due to the chain and sprocket connection between pipes 30 and 28, pipe 28 is also rotated. Thus, no matter how many backwash pipes are employed, they may all be rotated by a common drive.

The upper ends of the pipes 28, 30 are closed off but their lower ends open into a backflush plenum formed by walls 58, 60 and 62 together with end plate 24. An inlet pipe 64 is connected to the backwash plenum and extends through the bottom of the pressure vessel so that it may be connected to piping on the exterior of the pressure vessel.

Referring to FIGS. 2 and 3, a valve 66 is provided in a line 68 connected to the backflush inlet 64, and this line is also connected to the clean liquid tank 79 via pump 81. A dirty liquid line 70 leads into the pressure vessel 12 and serves to supply dirty liquid from tank 71 into the pressure vessel to be filtered by passing radially inwardly through the filter medium 18. A valve 72 is provided in line 70 for controlling the flow of liquid through the line.

Filtrate is withdrawn from inside the tubular member 22 by gravity flow of the liquid through an outlet pipe 74 which is connected to the tubular retainer member 22 at one end and which extends at its other end through the wall of the pressure vessel 12. This outlet 74 is connected by a line 76 to the storage tank 79 for clean liquid, and a valve 78 is provided in this line 76 for controlling the flow of liquid therein. Valve 78 is opened during filtering operations, but is closed during backwashing. A line 80 interconnects lines 68 and 76 to allow backwash liquid to flow from line 68 into the outlet pipe 74 above the valve 78 and up into the filter through the perforate tubular member 22.

Thus, the backwash liquid flows into the filter medium through the headers 28 and 30 and also through the tubular retainer member 22. Dirty backwash liquid is drained from the pressure vessel through a line 82 which has a valve 84 in it for controlling the flow of backwash liquid into a backwash tank 85.

Prior to a filtering cycle, the filter medium is compressed or compacted by applying high pressure to the filter medium in the manner indicated in FIG. 1, the filtering operation then being carried out at a lower pressure. In the embodiment of FIGS. 2, 3 and 4, this is accomplished by supplying liquid from clean liquid tank 79 through pump 81, pipe 68, pipe 94 and valve 96 to the space above perforate plate 26, the normal backwash valve 66 being closed. The liquid flows down through the perforations in plate 26, down through the top of the filter medium, and out through retainer 20. The liquid then flows to tank 85 through pipe 82 and valve 84. The pump 81 causes the liquid to exert a relatively great pressure on the filter medium, and since the top of the filter medium is smaller in area than the cylindrical sides of the medium at the retainer 20, a greater pressure is exerted on the medium than when liquid is flowing in through retainer 20 during filtering, assuming that pump 81 has at least the capacity of pump 73. Expressed in different terms, the full flow of pump 81 is exerted on the smaller annular end area of the bed 18, and this greater flow compacts the bed axially downward. This pressure, or flow, by compacting the medium, reduces the size of the voids therein and improves the filtration process, as explained above.

During filter operations, valves 72 and 78 are open and valves 66, 79, 84 and 96 are closed. Liquid to be filtered is supplied through line 70 to the inside of the pressure vessel, fills the pressure vessel, and passes primarily radially through the retainer member 20 and the filter medium 18, to the inside of retainer member 22. The imperforate, skirted cap structure provided by the top wall 42 and the perforate wall 26 seals off the annular upper end of the bed 18.

The clean effluent flows from within the tubular retainer 22 through the outlet pipe 74 via line 76 to the storage tank 79 for clean effluent. As the liquid flows through the filter under pressure applied by the pump 73 in line 70, the filter medium 18 removes foreign substances from the liquid. As filtration continues, the pressure differential across the filter medium builds up and the pressure in vessel 12 rises. When the filter medium becomes clogged to a predetermined maximum degree, e.g. 15 pounds per square inch as shown in FIG. 1, it is time to renew the filter medium. The occurrence of this condition may be sensed, for example, by monitoring the pressure inside the vessel 12 (as by pressure switch PS OF FIG. 2), by measuring the volume of flow through line 76, or the like. At the appropriate value corresponding to maximum permissible filter clogging, valves 72 and 78 are closed and valves 66, 79 and 84 are opened to begin the backwashing cycle. Valve 96 remains closed.

During backwashing, clean liquid, which may be taken from the clean liquid tank 79, is pumped by a pump 81 through line 68 and valve 66 to the backwash pipes 28 and 30 which are embedded in the filter medium. The pipes 28 and 30 distribute the backwash liquid throughout the filter medium, thereby insuring full coverage of the filter medium during backwashing. The backwash liquid which flows through the openings of pipes 28 and 30 is under high pressure produced by the pump 81. Therefore, the liquid issues from pipes 28 and 30 in the form of jets which agitate the medium the break it up into a slurry, thereby insuring thorough mixing and scrubbing of the medium. Clean backwash liquid will also flow through the cross connecting pipe 80 to line 76, and from there through pipe 74 into the space within tubular retainer member 22. This portion of the backwashing liquid then flows into and through the filter via the openings in the tubular retainer member 22.

When the valves 66, 79 and 84 are opened, the motor 54 for driving the sprockets 36 and 38 is started, so that the pipes 28 and 30 are rotated during backwashing. This further helps to assure that full coverage of the filter medium and thorough agitation is obtained during backwashing.

Dirty backwash liquid is drained from the pressure vessel 12 via line 82 and valve 84 to the holding tank 85 where the backwashing liquid is collected for further processing, e.g. settling of removed solids and decanting of the supernatant liquid. The backwashing liquid agitates and scrubs the filter medium and breaks up its compactness, so as to wash out the dirt substances which have collected in the medium during filtration. Backwashing continues for a predetermined time interval, after which valve 66 closes and valve 96 opens to begin the compaction portion of a new cycle.

The control circuit for carrying out the cycle as just described is shown in FIG. 4. The various branch circuits are connected across a power supply 100 and an on-off switch. Valves 72 and 78 are operated by solenoid S1 connected in series with relay contacts R2-3 and R1-4 across the power supply 100. The motor of pump 73 is in parallel with solenoid S1 and is energized simultaneously with solenoid S1.

Valves 66 and 79 are operated by a solenoid S2 connected in series with relay contacts R1-2 across the power supply. The motor 54 for rotating the backflush pipes 28 and 30 is in parallel with solenoid S2 for simultaneous energization. The fluid motor 54 is provided with a conventional reversing valve arrangement not shown in detail.

Valve 84 is operated by solenoid S3 connected in series with parallel relay contacts R1-3 and R2-1 across the power supply. The motor of pump 81 is connected in parallel with solenoid S3.

Valve 96 is operated by a solenoid S4 which is connected in series with timer contacts T1-2 and T2-1 across the power supply. Relay R2 and timer T2 are in parallel with solenoid S4. Relay contacts R2-2 are in parallel with timer contacts T1-2.

A pressure switch PS, connected in series with a timer T1 and also with a relay R1 which parallels the timer T1. Relay contacts R1-1 bypass the pressure switch PS, and timer relay contacts T1-1 are connected in series with the pressure switch PS.

In operation, the pressure switch PS closes when the pressure within vessel 12 reaches a predetermined value indicating a maximum permissible clogging of the filter medium. This energizes relay R1 to close its contacts R1-1, R1-2 and R1-3, and opens its contacts R1-4. Timer T1 operates with a delayed action, so that its contacts T1-1 remain closed and T1-2 remain open for a predetermined time interval during which backflushing takes place.

The closing of relay contacts R1-1 assures that the relay R1 and timer T1 will remain energized after the pressure switch PS opens. The opening of relay contact R1-4 deenergizes solenoid S1 which, in turn, closes valves 72 and 78 to end a filtering portion of a cycle of operation. The motor of pump 73 is also deenergized. The closing of relay contacts R1-2 energizes solenoid S2 which, in turn, opens valves 66 and 79 to begin a backwash portion of the cycle of operation. Motor 54 is also started so as to rotate the backwash header pipes 28 and 30. The closing of relay contacts R1-3 energizes solenoid S3 which then opens valve 84 to allow contaminated backwash liquid to drain to the tank 85. Simultaneously, the motor of pump 81 is also started.

Backwash liquid flows through the filter medium, agitating and washing it thoroughly as described above, and continues to flow until timer T1 times out and its contacts T1-1 open. The opening of contacts T1-1 deenergizes relay R1 and also timer T1. Relay contacts R1-1, R1-2 and R1-3 open, and relay contacts R1-4 close. Solenoid S2 is deenergized to close valves 66 and 79, and motor 54 for rotating the header pipes is also deenergized.

As soon as timer T-1 times out, its contacts T1-2 closes to energize solenoid S4, relay R2 and timer T2. Solenoid S4 opens valves 96 to begin a compaction portion of the cycle. The energization of relay R2 closes contacts R2-1 to keep the motor for pump 81 running and to keep solenoid S3 energized so that valve 84 remains open, even though relay contacts R1-3 open at this time. Relay contacts R2-2 close to keep relay R2, solenoid S4 and timer T2 energized after contacts T1-2 open. The opening of contacts R2-3 keeps solenoid S1 and the motor for pump 73 deenergized.

Clean liquid is pumped from tank 79 by pump 81 and flows through line 94 to the top of the filter medium, from there downward and outward through the filter medium and out through line 82 and valve 84 to tank 85. When timer T2 times out, its contact T2-1 open to deenergize relay R2, solenoid S4 and timer T2. The deenergization of solenoid S4 closes valve 96. Contacts R2-1 of relay R2 open to deenergize solenoid S3, thus closing valve 84, and to deenergize the motor for pump 81. Contacts R2-2 of relay R2 open to keep relay R2, solenoid S4 and timer T2 deenergized. Contacts R2-3 of relay R2 close to energize solenoid S1 and the motor for pump 73. Solenoid S1 opens valves 72 and 78 to allow dirty liquid to flow from tank 71 through the filter medium, and thus the system goes through another cycle in the manner just described.

STRUCTURE AND OPERATION OF THE EMBODIMENT OF FIGURE 5 through 8

FIGS. 5—8 illustrate another embodiment of the invention, and in this embodiment a particulate filter medium is retained between wedge wire retainer elements and stationary backflush headers are provided at different levels within the filter medium.

Figure 5:
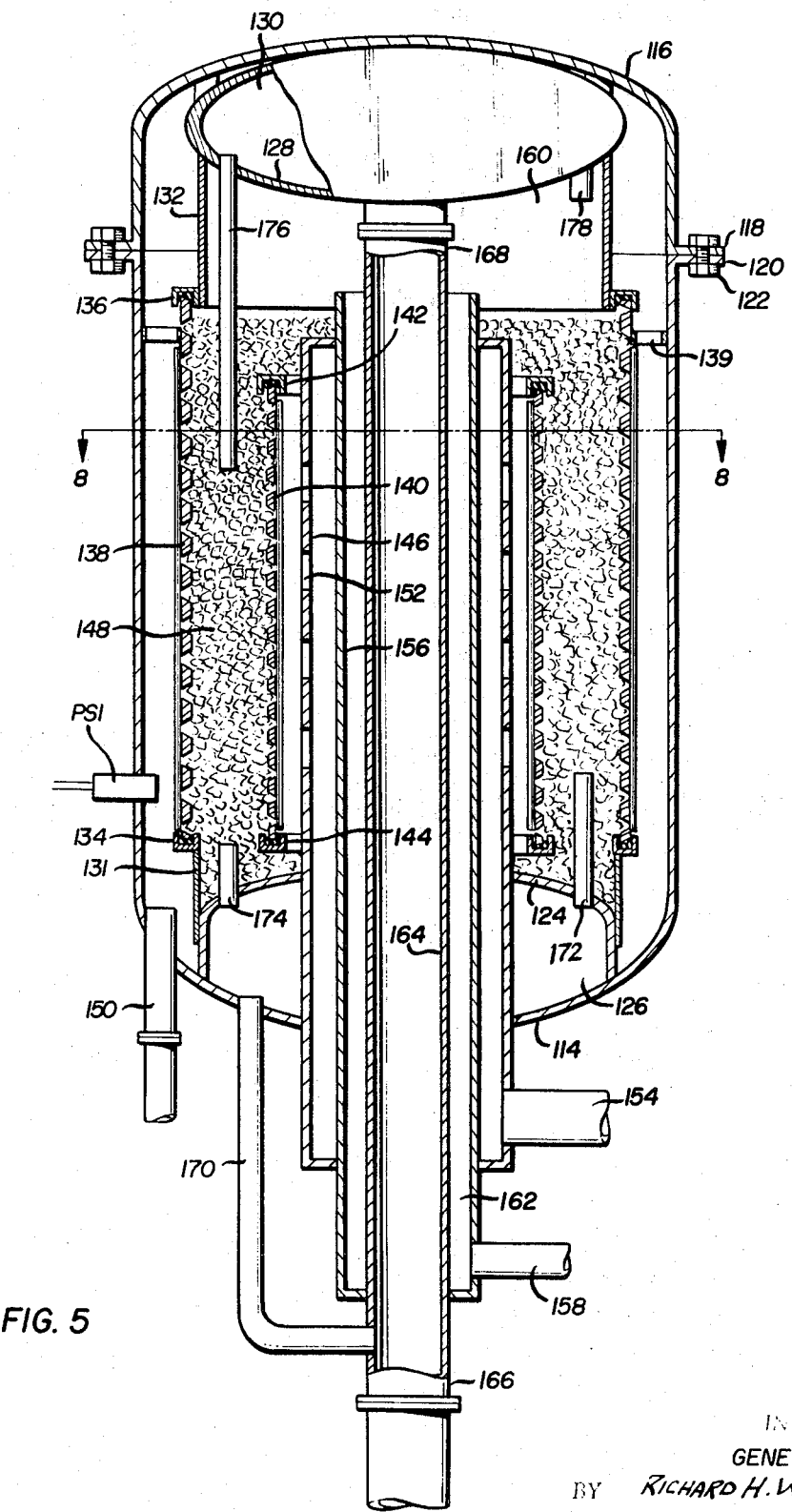
FIG. 5 is a vertical sectional view of a cartridge provided in a pressure vessel in accordance with another embodiment of the invention.
Figure 8:
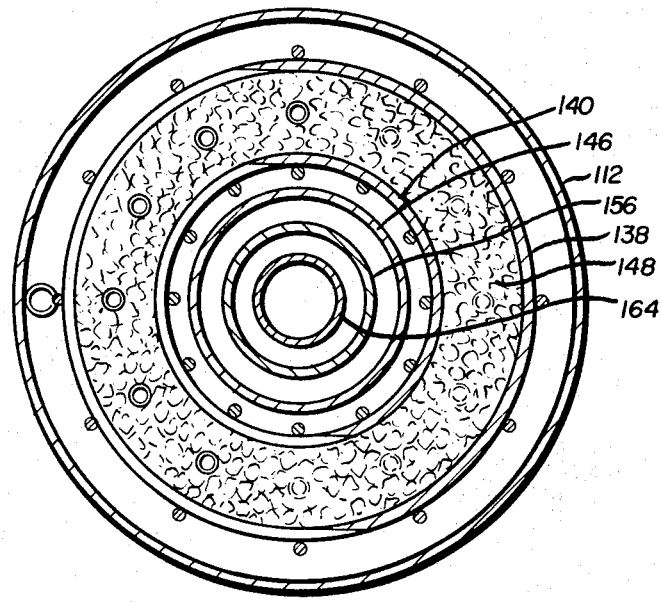
FIG. 8 is a cross-sectional view of the embodiment of FIG. 5.

Referring first to FIGS. 5 and 8, the filter includes a pressure vessel 110 having a sidewall 112, a bottom wall 114 and a dome-shaped top 116 secured to sidewall 112 at flanges 118 and 120 by bolts 122. Inside and at the bottom of the pressure vessel 110 there is a dished head 124 which forms, together with bottom wall 114, a sealed chamber 126, and at the top end of the pressure vessel there is a head 128 which forms another sealed chamber 130. Attached to walls 124 and 128 are vertical support walls 131 and 132 having opposing, vertically confronting peripheral sealing channels 134 and 136. Seated in and extending between the two annular channels 134, 136 is a tubular outer retainer 138 which, in this embodiment, is made of wedge wire round so as to leave a small gap between each turn of the wedge wire. Another similar, but smaller tubular retainer 140, also formed of wedge wire, is seated in smaller, similar, annular channels 142 and 144 which are secured to a tube 146 spaced inwardly from the inner retainer 140. Sealing gaskets may be provided between the ends of the retainer elements 138 and 140 and the various flanges. The two concentric, tubular retainers 138, 140 are centralized in the vessel 110 by an upper, radial support spider 139.

A finely divided particulate medium 148 is provided between the retainers 138 and 140 and fills all of the annular space between these retainers. The filter medium may be made up of particles of polyethylene, polyvinyl chloride or wood sawdust, and should have all of the properties of the filter medium described previously in connection with the embodiment of FIGS. 2—4. A filter medium of these materials and with these properties is compressible, and the filter medium 148 is compressed prior to filtration in the operation of the filter as will be described later.

An inlet pipe 150 communicates with the space between the outer retainer 138 and the sidewall 112 or the pressure vessel. The pipe 150 serves as an inlet for introducing contaminated liquid into the filter, and also serves as an outlet for removing backwash liquid from the filter as will be described. Incoming contaminated liquid passes through the outer retainer 138, flows radially inward through the filter medium 148, passes through the inner retainer 140, and flows through openings 152 in the tube 146 into the interior of the tube. Contaminants are removed from the liquid as it passes through the filter medium 148, and they become entrapped in the filter medium. Clean liquid flows downwardly through tube 146 and out through an outlet pipe 154 communicating with the bottom of the tube 146.

Inside tube 146 and concentric therewith, there is another tube 156 which has a pipe 158 communicating therewith at its lower end and which has its top end projecting above the top of the filter medium and opening into a space 160 above the filter medium. In the compacting portion of a cycle of operation, liquid, which may be contaminated liquid, flows into the space 162 within tube 156 via pipe 158 and flows upwardly through tube 156 into space 162 within tube 156 via pipe 158 and flows upwardly through tube 156 into the space 160 above the filter medium. The liquid then flows downwardly through the filter medium and inwardly through retainer 140 into tube 146, and from there to a clean liquid tank via pipe 154. In FIG. 5, the filter medium is shown compressed.

Inside tube 156 and coaxial therewith is still another tube 164 which communicates at its bottom end 166 with a clean liquid tank, and which communicates at its top end 168 with chamber 130. A branch pipe 170 branches off from tube 164 and leads into the lower chamber 126. Chamber 126 communicates with the interior of the filter medium through a ring of long pipes 172 and a ring of shorter pipes 174. Similarly, chamber 130 communicates with the interior of the filter medium through a ring of long pipes 176, and communicates with the space 160 above the filter medium through a ring of shorter pipes 178. Because of the different lengths of these pipes, backwash liquid is introduced into the filter medium at different levels of the medium. Backwash liquid is pumped into tube 164 and flows from there through chamber 130 and pipes 176 and 178 into the filter medium. The backwash liquid also flows through pipe 170 into chamber 126 and from there through pipes 172 and 174 into the filter medium. The backwash liquid, which may be clean liquid from a clean liquid tank, is pumped under enough pressure so that it is supplied to the filter medium in the form of jets, and these jets put the filter medium into a slurry and agitate and thoroughly scrub the filter medium such that it is cleaned thoroughly. The contaminated backwash liquid flows outwardly through retainer 138 and out of the pressure vessel through pipe 150. It may be noted that this flow of backwash liquid is in the reverse direction through the inlet retainer 138, so that if any dirt has been trapped on the outer surface of the wedge wires during the filtering portion of a cycle, it is flushed out by the backwash liquid and removed from the retainers.

Figure 6:
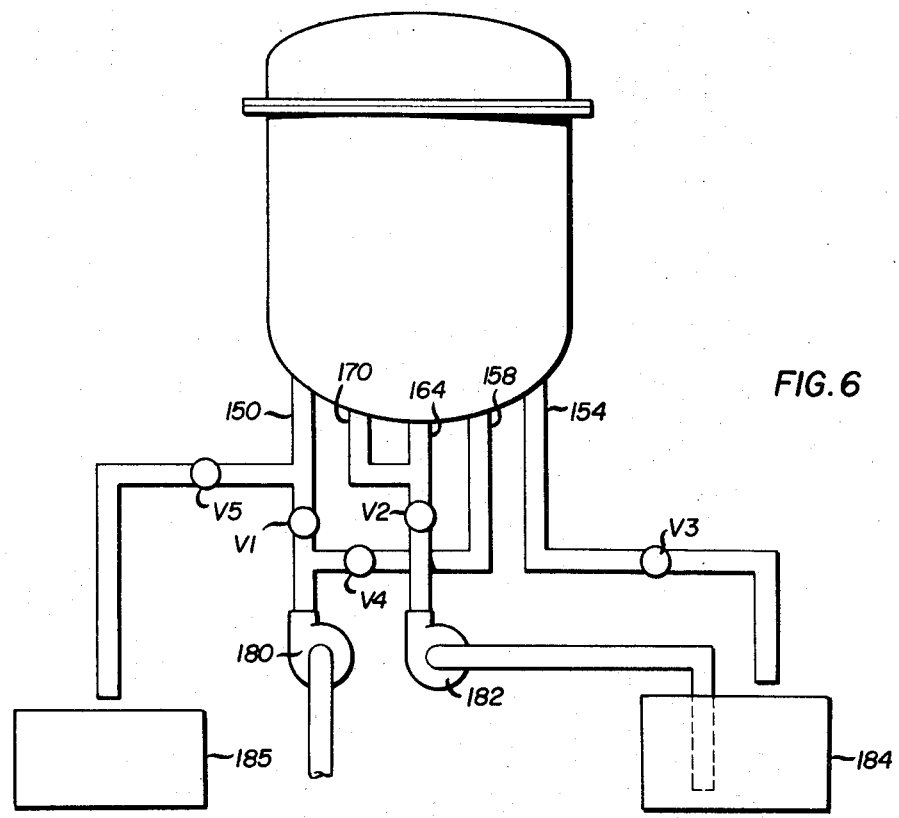
FIG. 6 is a schematic diagram illustrating the liquid flow circuit for the filter of FIG. 5.
Figure 7:
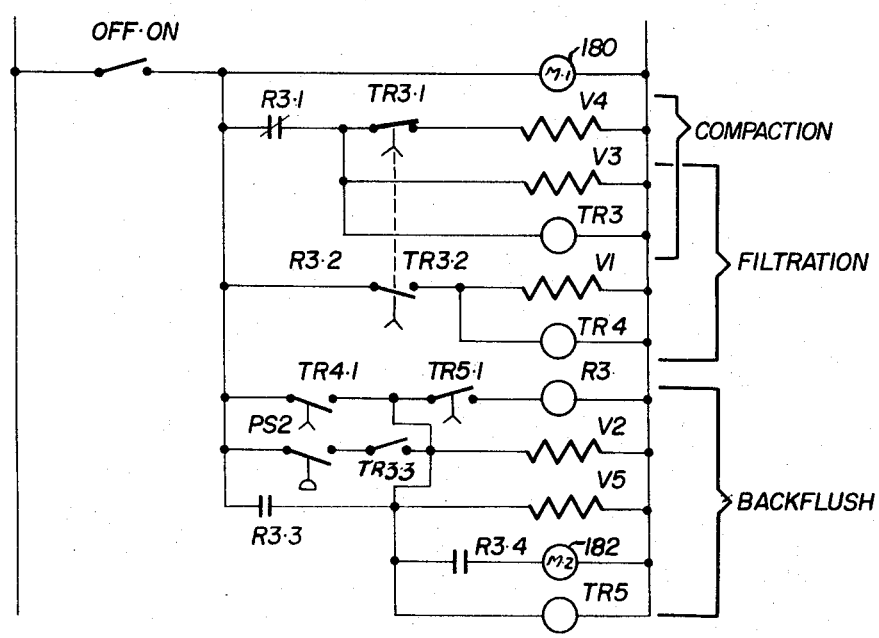
FIG. 7 is an electrical circuit diagram showing an electrical control circuit for the embodiment of FIGS. 5 and 6.

Referring now to FIGS. 6 and 7, the controls for the filter of FIG. 5 will be described. M1 is the motor for the pump 180 which supplies dirty liquid to the filter. M2 is the motor for pump 182 which supplies clean backwash liquid from tank 184 to the filter. TR3 is the timer for the compaction portion of a cycle. TR4 is the timer for the filtration portion of a cycle. TR5 is the timer for the backflush portion of a cycle. PS2 is a pressure switch which senses the pressure in the space outside retainer 138. R3 is a relay.

To start a cycle, the on-off switch is closed. This energizes motor M1, and simultaneously energizes valves V3 and V4 to open them. Contaminated liquid is pumped by pump 180 through valve V4 and pipe 158 into tube 156 (FIG. 5), and from there into the space 160 above the filter medium. This liquid flows downwardly through the filter medium, through retainer 140 and into tube 146, out through pipe 154 through valve V3 into the clean liquid tank 184. The pressure applied by this initial flow of liquid as it passes through the filter medium compresses and compacts the filter medium to reduce the size of the voids therein as previously explained, and this prepares the medium for a more effective filtration. This flow of liquid continues until timer TR3 times out.

Then, contacts TR3-1 open to close valve V4, with valve V3 remaining open. Contacts TR3-2 close to initiate the filtration portion of a cycle. The closing of contacts TR3-2 causes valve V1 to open so that the motor M1 for pump 180 now causes pump 180 to pump liquid through valve V1 and pipe 150 into the space surrounding the outer retainer 138 of the filter. This liquid flows through the filter medium and out through pipe 154 and valve V3 into the clean liquid tank 184.

It may be noted that the same pump 180 is used both to pump liquids downward through the top of the filter medium during the compaction portion of a cycle and also radially inward through the side of the filter medium during the filtration portion of a cycle. Since the top of the filter medium is substantially smaller in area than the side of the filter medium, the pressure exerted downwardly on the top of the filter medium is substantially greater than the pressure exerted on the side of the medium during filtration. Also, the flow rate expressed as "gallons per minute per exposed square root of area" is initially much greater. In this manner, the same pump can be used to produce a high pressure on or a high flow rate through the filter medium for compaction and a lower pressure on or lower flow rate through the medium for filtration.

The filtration portion of a cycle continues until either timer TR4 times out or until pressure switch PS2 is closed as pressure builds up in the space outside the outer retainer 138. Assuming that pressure switch PS2 closes first, since contacts TR3-3 have closed previously, relay R3, valves V2 and V5, and timer TR5 are all actuated. The energizing of relay R3 opens contacts R3-1 to close valve V3, opens contacts R3-2 to close valve V1, closes contacts R3-3 to hold in relay R3, and closes contacts R3-4 to energize the motor M2 for pump 182 to start pumping backwash liquid through valves V2 and V5. The latter liquid flows through tube 164 up through the center of the filter and also through the branch pipe 170 into the bottom head of the filter, and then through the headers 172, 174, 176 and 178 which lead into the filter medium to backwash the filter medium. The backwash liquid flows out through pipe 150 and through valve V5 to a tank 185.

This flow of liquid continues until timer TR5 times out, and this opens contact TR5-1 to deenergize relay R3. With relay R3 deenergized, contacts R3-1 and R3-2 close to condition the associated circuits for a new cycle, and contacts R3-3 and R3-4 open to stop motor M2 for pump 182 and close valves V2 and V5. The timers TR3, TR4 and TR5 reset automatically.

THE STRUCTURE AND OPERATION OF THE EMBODIMENT OF FIGURE 9

Figure 9:
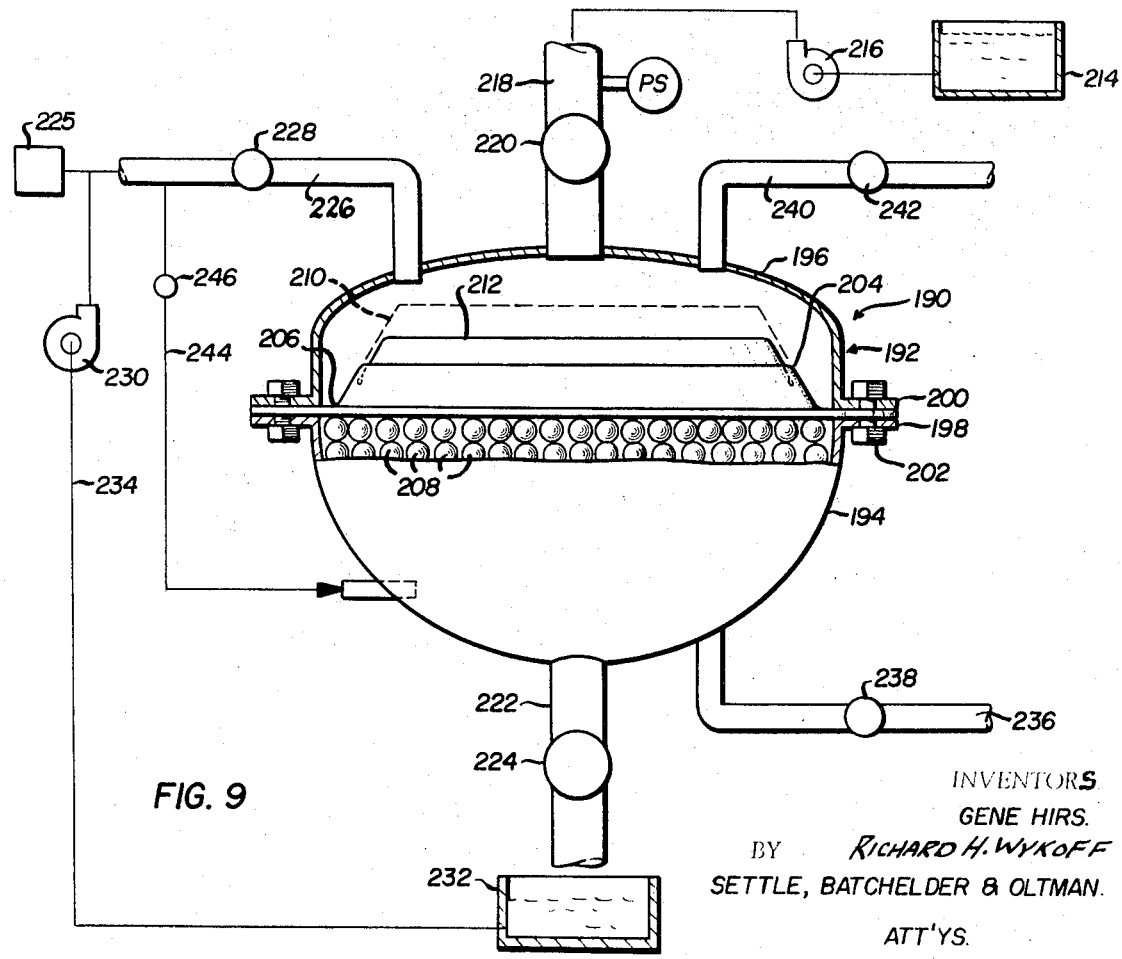
FIG. 9 is a view, partly in cross section and partly in elevation, for an embodiment of the invention in which the filter medium is provided in a plastic cartridge.
Figure 10:
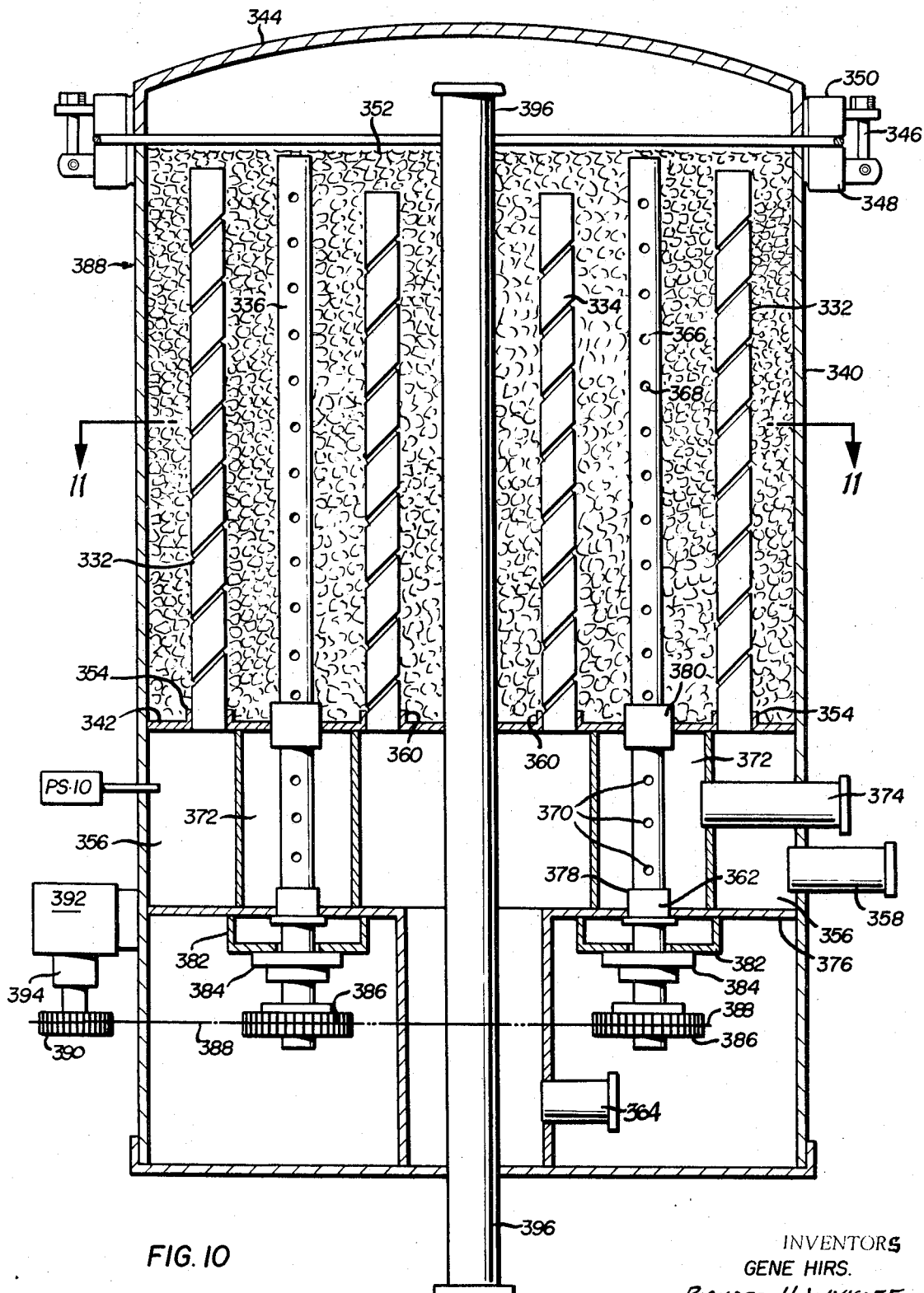
FIG. 10 is a schematic view of another embodiment in which the filter medium is transferred from a filter casing to a separate receptacle for backflushing.
Figure 13:
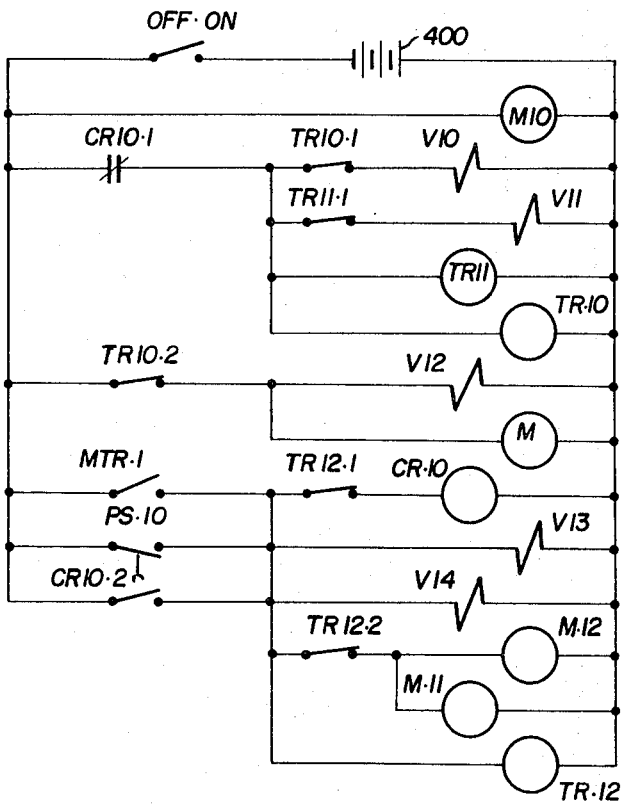
FIG. 13 is a schematic diagram of the liquid flow circuit for the embodiment of FIGS. 11 and 12.
Figure 11:
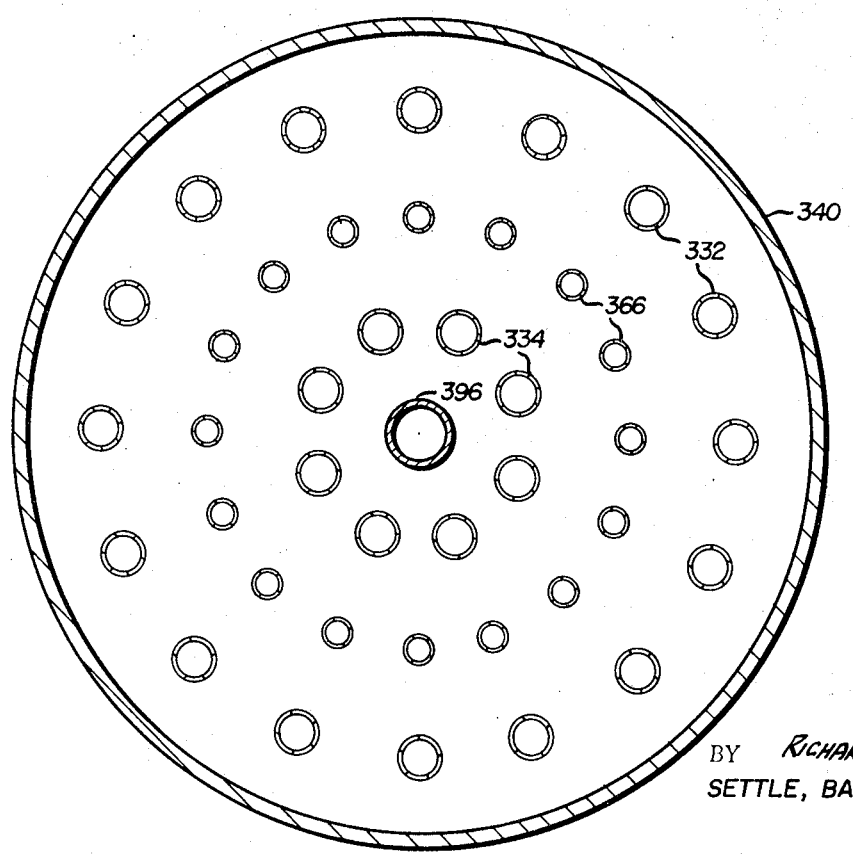
FIG. 11 is a vertical sectional view of another filter embodiment of the invention in which retainers at the inlet and the outlet sides of the filter medium are in the form of tubes.
Figure 12:
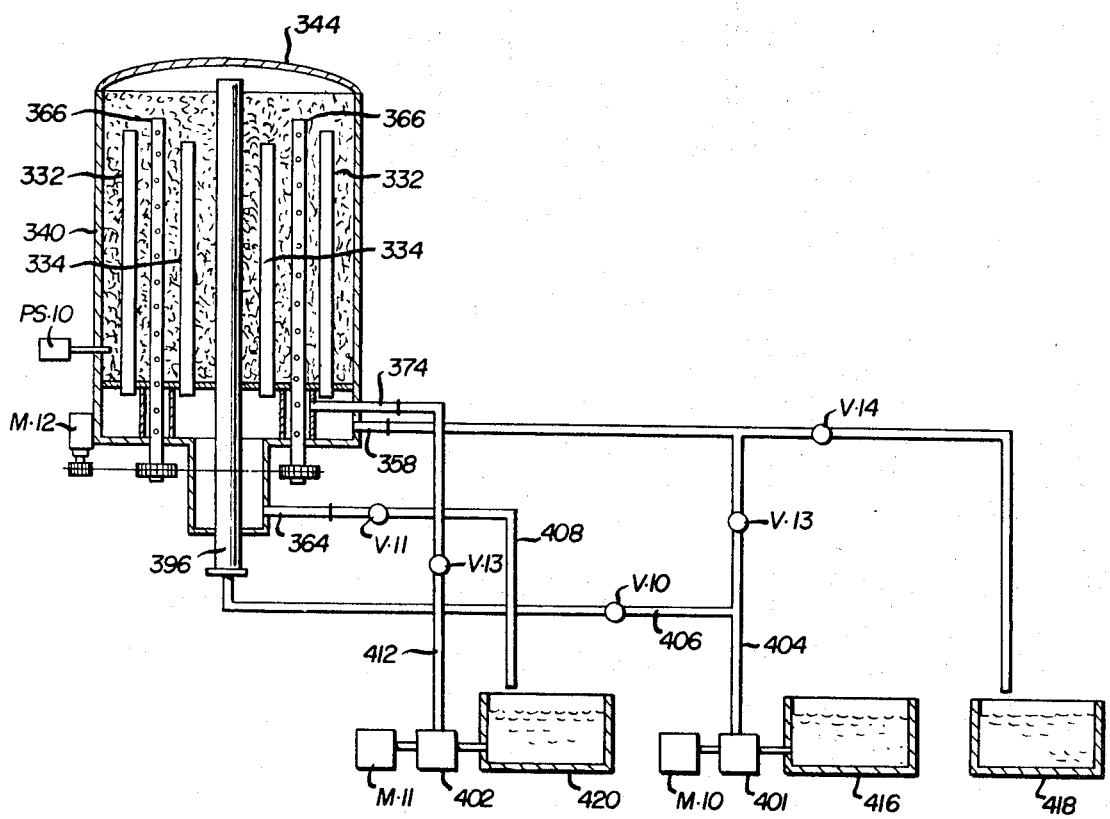
FIG. 12 is a top plan view of the tube arrangement in the embodiment of FIG. 11.

FIG. 9 illustrates another embodiment of the invention in which the filter 190 includes a pressure vessel 192 comprising a dished receptacle 194 and a dished cover 196 secured and sealed together at flanges 198 and 200 by bolts 202. Inside pressure vessel 192 is a liquid permeable plastic cartridge 204 which contains a finely divided particulate filter medium of the type described previously. That is, the particles of the filter medium may be polyethylene, polyvinyl chloride or wood sawdust having all of the properties described previously in connection with the embodiment of FIGS. 2—4. Again, the filter medium is compressible, and a prefiltering compression operation is carried out to compact the filter medium and reduce the size of the voids therein prior to a filtration operation. The bottom wall 206 of the plastic cartridge 204 is clamped between the flanges 198 and 200 to retain the filter cartridge in place. Also, bottom wall 206 is supported on beads 208, which may be made of glass, filling the bottom receptacle 194.

When the filter medium is in a loose condition, the plastic cartridge 204 takes the expanded form indicated at dashed line 210 in FIG. 9. After the cartridge 204 and the filter medium therein have been compressed, the cartridge 204 takes the reduced size form indicated by solid lines 212 in FIG. 9.

To start a cycle, contaminated liquid is pumped from a tank 214 by a pump 216 through a pipe 218 and a valve 220 into the space within the cover 196 of the pressure vessel. This liquid flows into the top of the plastic cartridge 204, through the filter medium within the cartridge, out through the bottom wall 206 of the cartridge, through the beads 208 and out through an outlet pipe 222 and a valve 224 to a clean liquid tank 232. The flow rate of the liquid through the filter medium may be increased during an initial compaction portion of the cycle to thereby increase the pressure on the filter medium and thus compact it. This may be accomplished by supplying air under pressure from a source 225 through pipe 226 and valve 228 into the space within the cover 126 of the pressure vessel. This additional pressure is applied to the filter medium for a predetermined time in order to compact the filter medium, and then valve 228 is closed and the filtration of liquid supplied from tank 214 is continued at a lower pressure. It may be noted that the pressure of the air supplied through pipe 226 is greater than that supplied by pump 216, and consequently valve 220 may be a check valve to prevent air from flowing back through pipe 218. Preferably, air pressure is introduced after the space over the cartridge 204 is filled with liquid by the pump 216. The valve 220 may be specifically closed or it may close by its check characteristics if desired.

An alternate way of accomplishing the compression portion of a cycle is to supplement the pressure provided by pump 216 with another pump 230 which pumps liquid from the clean liquid tank 232 through lines 234 and 226 and valve 228 into the pressure vessel. The pumping of additional liquid to supplement that pumped by pump 216 is continued for a predetermined time allowing sufficient time for the filter medium within cartridge 204 to become compressed, and then valve 228 is closed and the flow of contaminated liquid from tank 214 through pipe 218 continues during a filtration portion of the cycle. In the use of the two pumps 216 and 230 for compaction, the increase in flow rate through the medium will effect the compaction of the medium.

Pressure switch PS1 senses the pressure in the inlet pipe 218, and the pressure switch is locked out during the compression portion of a cycle. During filtration, however, the pressure switch is active, and when the inlet pressure builds up to a predetermined value indicating maximum allowable clogging of the filter medium, valves 220 and 224 are closed automatically, and a backflushing portion of the cycle commences. Backwash liquid enters the pressure vessel through line 236 and valve 238, flows in the reverse direction through the filter medium, and flows out through line 240 and valve 242. Air may also be introduced into the pressure vessel from source When all the contaminated liquid has drained out of tank 273 liquid is fed into tank 273 through line 301 and valve 302, and a clean slurry is formed in tank 273. This slurry is pumped by pump 276 through line 274 and open valve 275 back through tube 270 into chamber 255. Valve 305 in drain line 306 is open, while valves 277, 284, 288, 292 and 295 are closed, so that the refill slurry liquid drains out through the outer array of inlet pipes 268, insuring refilling of the tank 254 with the filter medium 266. A drain line 308 and valve 310 are provided to drain any residue in tank 297 to the dirty liquid tank 280, if desired.

After the filter medium has been returned to the filter unit, pump 276 stops, valve 275 is closed and the pump 294 may be utilized to apply pressure to the top of the filter medium to provide a high pressure drop through the relatively smaller dimension of the medium (approximately 25 to 30 pounds per square inch), so as to compress and compact the filter medium prior to a filtration operation. Thus, a compaction portion of the cycle may be carried out before filtering begins. After a predetermined period of time, valve 292 closes and pump 294 is deenergized. Valve 305 is closed, valves 284 and 288 are then opened, and pump 282 is actuated to begin pumping contaminated liquid from tank 280 through the filter medium 266 again to carry out another filtration operation.

Figure 14:
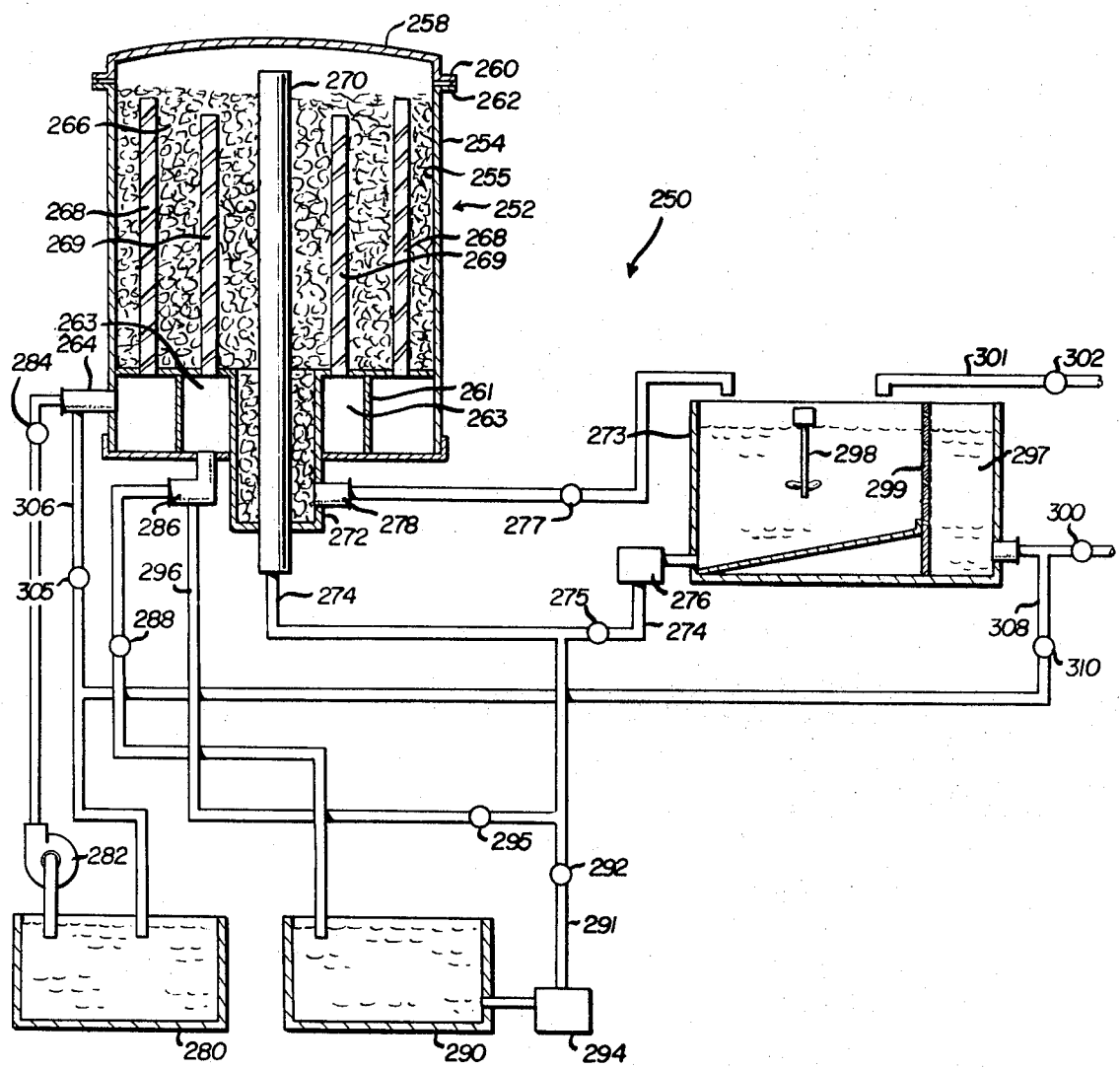
FIG. 14 is an electrical schematic diagram of the electrical control circuit for the embodiment of FIGS. 11 and 12.

It will be understood that the filter medium 266 may be the same as that described in connection with the embodiment of FIGS. 2—4, and thus it can be compacted in the manner described above. The lightness and toughness of the medium is also an advantage in the embodiment of FIG. 14 because it facilitates the transfer of the filter medium from the filter unit 250 to the receiver tank 273 and back from the receiver tank to the filter unit. The transfer of the filter medium to the receiver tank 273, and the agitation therein by the agitator 298 assures that the filter medium will be thoroughly broken up and scrubbed during backwashing to remove all or nearly all of the dirt previously entrapped therein.

THE STRUCTURE AND OPERATION OF THE EMBODIMENT OF FIGURE 15

Figure 15:
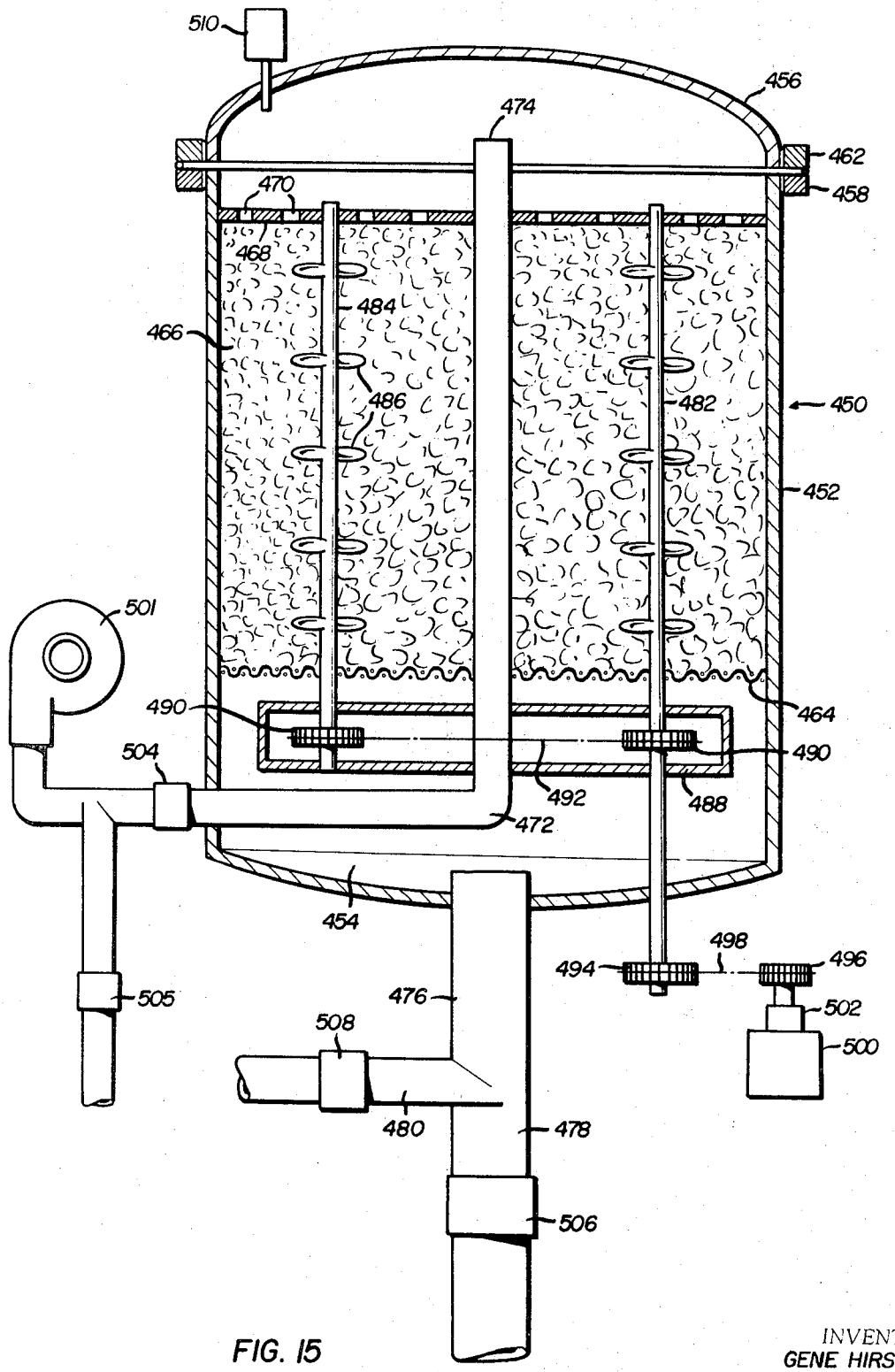
FIG. 15 is a vertical sectional view of a filter embodiment of the invention in which only one perforate retainer is used for confining the filter medium and a mechanical agitator is embedded in the filter medium.

FIG. 15 shows schematically another filter embodiment of the invention. The filter includes a pressure vessel 450 having a sidewall 452, an integral bottom wall 454 and a dome-shaped cover 456 secured to sidewall 452 at flanges 458 and 460 with bolts 462. Inside the pressure vessel is a transverse retainer element 464 which may be a liquid permeable screen having a pore size small enough to prevent the filter medium 466 from passing through it. The filter medium 466 is supported by the retainer element 464, which may have a rigid backing for support purposes, and the filter medium may be the same finely divided particulate and compressible material described previously in connection with the other embodiments of the invention. That is, it may be polyehtylene, polyvinyl chloride or wood sawdust having the properties described particularly in connection with FIG. 2.

Above the filter medium is a perforate plate 468 having openings 470 in it to permit liquid to flow through the plate. A first conduit 472 extends transversely into the pressure vessel 450 and bends at a right angle to extend upwardly through the center of the filter medium terminating in an open end 474 above plate 470 within the dome-shaped cover 456. Liquid flows into conduit 472 during compaction and filtering and flows out of conduit 472 during backflushing. A second conduit 476 extends downwardly from the bottom wall 454 of the pressure vessel, and this conduit has two branches 478 and 480 which are of different sizes as shown. As will be explained further, liquid flows through branch conduit 478 during the compaction portion of the cycle, and this branch conduit is larger than branch conduit 480 so that a relatively high flow rate is obtained during compaction for applying the high pressure to the filter medium to compress and compact it. During a subsequent filtration portion of a cycle, the liquid flows out of pressure vessel 450 through conduit 480, and since this conduit is smaller in diameter than conduit 478, a lower flow rate of liquid through the filter medium is obtained and less compaction force is exerted by the liquid on the filter medium. Thus, a high pressure is applied to the filter medium during an initial compaction portion of a cycle, and a lower pressure is exerted on the medium during a subsequent filtration portion of a cycle in the manner illustrated by the curve of FIG. 1.

Following filtration, the filter medium is backwashed, and for this purpose backwash liquid is introduced into either branch conduit 478 or 480, flows through conduit 476 into the pressure vessel, flows through retainer 464 and upwardly through the filter medium 466, through plate 470, into the open end 474 of conduit 472, downwardly through conduit 472 and out of the pressure vessel. During this flow of backwash liquid, mechanical agitators 482 and 484 are rotated so that vanes 486 agitate the filter medium to make sure that it is completely broken up, put into a slurry, intermingled and turned over during backwashing. This complete agitation of the filter medium is particularly important due to the fact that the filter medium is compacted prior to filtration, and breaking up of the filter medium is necessary to remove all or nearly all of the dirt entrapped in it.

The agitators 482 and 484 are supported for rotation by plate 468. Lower ends of the agitators are located within a chamber 488 provided below the retainer element 464, and sprockets 490 are mounted on the lower ends of the agitators within chamber 488. A chain indicated by a dashed line 492 interconnects the sprockets 490. Extending downwardly from sprocket 490 is a shaft which extends through the bottom wall 454 of the pressure vessel, and a sprocket 494 is mounted on the lower end of the shaft. The latter sprocket is connected to another sprocket 496 by a chain 498, and sprocket 496 is driven by a motor 500 through a reducer 502. Thus, there is a common drive for all of the sprockets 490. It may be noted that more than two agitators may be provided in the filter medium if desired.

Conduits 472, 478 and 480 respectively have valves 504, 506 and 508 in them. At the beginning of a cycle of operation, valve 504 and valve 506 are open, and valve 508 is closed. Contaminated liquid is pumped by a pump 501 through valve 504 and conduit 472 into the space above the filter medium 466, and this liquid flows downwardly through the filter medium, through retainer element 468 and out of the pressure vessel through conduits 476 and 478 and valve 506 to a clean liquid storage tank (not shown). This flow of liquid continues for a predetermined time sufficient to allow the filter medium to be compressed and compacted by the relatively high pressure applied to it (say 25 to 30 pounds per square inch), and then valve 506 is closed and valve 508 is opened. Contaminated liquid is pumped by pump 501 into the pressure vessel through conduit 472, and after passing through the filter medium the liquid flows out through branch conduit 480 and valve 508 to the clean liquid storage tank. As previously mentioned, since conduit 480 is smaller in diameter than conduit 478, a lower flow rate of liquid through the filter medium is obtained during this filtration portion of a cycle, and consequently, less pressure is applied to the filter medium during filtration than compaction.

The pressure dropped across the filter medium will gradually build up as more and more contaminants are trapped in the filter medium until a pressure switch 510 is actuated at a pressure value corresponding to a maximum permissible clogging of the filter medium. The duration of the filtration portion of the cycle could also be measured by a timer in addition to pressure switch 510 which would stop the filtration cycle after a maximum allowable period of time in the event that the pressure switch 510 is not actuated. Alternatively, a timer alone could be used in place of the pressure switch.

In any event, at the end of the filtration portion of the cycle, the pumping of contaminated liquid through conduit 472 is terminated. The motor 500 is started to rotate the agitators 482 and 484, and clean liquid is pumped through either branch conduit 480 or branch conduit 478. As s previously described, this clean liquid flows upwardly through the filter medium, and, together with the agitators 482 and 484, breaks up the filter medium, puts it into a slurry, thoroughly mixes and scrubs the filter medium and intermingles the particles of the filter medium so that a very high percentage of the dirt is removed from the filter medium. The dirty liquid flows into the open end 474 of conduit 472, and flows out of the pressure vessel through conduit 472 and valves 504 and 505 to a backflush liquid storage tank. The backwashing continues for a predetermined period of time as determined by a suitable timer, and then another cycle of operation begins.

SUMMARY

It is apparent from the foregoing description that the invention provides a method of filtering and filter apparatus which have several advantages over known methods and apparatus. The filter medium is fine and has many voids due to the nature of the plastic or wood sawdust particles of which the filter medium is composed, and this in itself provides relatively great retention in the filter medium. Furthermore, the filter medium is compactible, and the method and apparatus of the invention includes structure and steps for applying a compaction force to the filter medium at the beginning of a cycle to compress and compact the filter medium and thereby reduce the size of the voids therein. As has been explained, this results in the filtration of smaller dirt particles, an unusually high degree of retention of such particles in the filter medium during the filtration portion of a cycle, and at the same time filtration can be carried out at high flow rates. The filter medium is strong and light, and this means that it can be put into a slurry and agitated thoroughly during backwashing without breaking down into finer and finer particles.

Another feature of the invention is the provisions for backwashing by both mechanical and hydraulic forces to assure that the filter medium is broken up, thoroughly agitated and scrubbed during the backwashing portion of a cycle. This mechanical and hydraulic backwashing is applied in all embodiments of the invention described herein, and is a particular advantage where the filter medium is compressed and compacted at the beginning of a cycle since known backflushing techniques would not break up the filter medium and turn the particles over to the degree required to remove all or nearly all of the dirt from the compacted filter medium. Since an unusually great amount of dirt is retained in the filter medium due to the compaction thereof, both agitating and hydraulic forces should be applied during backwashing to wash out all or nearly all of the dirt retained in the filter medium. As a result of the agitation less backwash liquid is required to break up the bed.

Preferably, a liquid permeable retainer is provided at both the inlet and the outlet side of the filter medium, and this assures that none of the filter medium is lost during backwashing. The backwash liquid flows in the reverse direction through the inlet retainer during backwashing, and this prevents undue clogging of the inlet retainer. Flow may also be reversed through the outlet retainer element so that it will not become unduly clogged either.

A particular feature is the provision of inlet and outlet retainers in the form of rings of tubes which provide a relatively great amount of inlet area through which the contaminated liquid is distributed, and thus further increases the dirt retaining capability of the filter medium. Backwashing is preferably accomplished by headers embedded in the filter medium or by transfer of the filter medium to a receptacle where it is agitated and flushed, and this provides thorough backwashing. However, internal headers are not required where agitators are provided in the filter medium as in the embodiment of FIG. 15. The apparatus of the invention is smaller than known deep bed filters and can be constructed economically so that large scale utilization thereof is feasible.

We claim:

1. A method of filtering comprising retaining a filter medium of finely divided particulate material of uniform specific gravity, having a specific gravity of less than about 1.55 and formed into a bed having voids therein, filtering by passing liquid contaminated with particulate dirt having a particle size of up to about 50 microns under pressure and at a flow rate of at least 6 gallons per square foot per minute through said filter medium to trap contaminants from said liquid in the voids of said filter medium while withdrawing cleaned liquid from said filter medium, terminating the flow of contaminated liquid through said medium only after the voids of said medium become at least partially clogged with at least about 5 cubic inches of contaminants per cubic foot of filter medium, and subsequently backwashing said filter medium by (1) introducing backwash liquid into the same and (2) agitating said filter medium to put the entire filter medium into a uniform slurry in which the medium particles are mixed and scrubbed to separate the contaminants therefrom, withdrawing backwash liquid and the contaminants admixed therewith from said slurry, and reforming said filter medium into a bed.

2. The method of filtering as claimed in claim 1 in which said filter medium is compactible to reduce the size of the voids therein, and wherein said method further includes the step of compacting said filter medium prior to said filtering step to reduce the size of the voids in said filter medium and thereby improve filtration of extremely small particles during said filtering step.

3. The method of filtering as claimed in claim 1 in which said backwashing step is carried out by introducing backwash liquid into said filter medium at a plurality of places within said filter medium separate from the places where contaminated liquid is introduced into and withdrawn from said filter medium.

4. The method of filtering as claimed in claim 1 in which said backwashing step is carried out by supplying backwash liquid to said filter medium while agitating said filter medium mechanically, and withdrawing said backwash liquid from said filter medium.

5. The method of filtering as claimed in claim 1 in which said backwashing step is carried out by forming said filter medium into a slurry, transferring said slurry to a separate receptacle, agitating said slurry to thoroughly separate contaminated liquid from said medium, removing said contaminated liquid, adding liquid to reform said filter medium into a slurry, transferring the reformed slurry from said receptacle to the location of said bed, and removing the slurry liquid to reform said bed.

6. The method of filtering as claimed in claim 5 in which liquid is added to said filter medium in said receptacle after said contaminated liquid has been withdrawn therefrom, the liquid and filter medium is transferred by pumping from said receptacle to put said filter medium in the form of a bed, and said pumping is done under pressure and flow conditions sufficient to compact said filter medium to thereby accomplish the compaction step of the next filtering cycle.

7. A filter apparatus including a casing having an inlet for contaminated liquid and an outlet for filtrate, a filter medium of finely divided particulate material having voids therein, said medium forming a bed within said casing to be traversed by liquid flowing from said inlet to said outlet, said bed being formed of substantially uniform sized particles ranging from about 0.25 millimeters to 0.71 millimeters of organic polymeric material having a uniform density of less than about 1.55, means for introducing backwash liquid into said casing to put the entire filter bed into a slurry, conduit means for conducting said slurry to a remote separating chamber, means in said separating chamber for withdrawing backwash liquid and any admixed dirt from said medium, and additional conduit means for conducting said medium as a slurry back to the bed location with in said casing.

8. The filter apparatus as claimed in claim 7 in which said backwash means includes a receptacle separate from said casing, means for transferring the slurry of backwash liquid filter medium from said casing to said receptacle, means for draining contaminated liquid from said slurry in said receptacle, an agitator for agitating said slurry in said receptacle during said draining, means to add liquid to said medium in said receptacle to reform a liquid-medium slurry and means for transferring said slurry from said receptacle back to said casing.

9. A filter apparatus comprising a casing having inlet means for contaminated liquid and an outlet for filtrate, a filter medium consisting essentially of synthetic organic polymeric material having a density of less than about 1.55 and being compressible to reduce the size of the voids therein, said medium forming a bed within said casing to be traversed by liquid flowing from said inlet to said outlet, and backwash means for introducing backwash liquid into said casing and including means for agitating the filter medium thoroughly during backwashing, (1) to put the entire filter bed into a slurry, (2) to mix and scrub the particles with one another to remove contaminants therefrom, and (3) to hydraulically flush the removed contaminants from said particles, and said inlet means including a first means for passing liquid through said filter medium bed at a first flow rate sufficiently high to compress said filter medium bed and thereby reduce the size of the voids therein, and second means for passing contaminated liquid through said compressed filter medium bed at a second flow rate lower than first said flow rate to entrap contaminants from said contaminated liquid in the reduced voids of said compressed filter medium bed.

10. The filter apparatus as claimed in claim 9 wherein said casing is provided with a pair of separate and distinct inlet openings, one of said openings supplying said liquid to a predetermined area of said filter medium, and second of said openings supplying said contaminated liquid to a different area of said filter medium larger than said predetermined area, and means for selectively supplying liquid to each of said openings so that the flow rate through said medium during compression thereof is greater than the flow rate therethrough during filtration.

11. A method of filtering comprising retaining filter medium of finely divided particulate material having a specific gravity of less than about 1.55 and formed into a bed having voids therein, filtering by passing liquid contaminated with particulate dirt having a particle size of up to about 50 microns under pressure and at a flow rate of at least 6 gallons per square foot per minute through said filter medium to trap contaminants from said liquid in the voids of said filter medium while withdrawing cleaned liquid from said filter medium, terminating the flow of contaminated liquid through said medium only after the voids of said medium become at least partially clogged with at least 5 cubic inches of contaminants per cubic foot of filter medium, and subsequently backwashing said filter medium.

12. In a method of filtering dirt from a liquid, rejuvenating a filter medium in the form of a bed of finely divided particulate material mixed with dirt removed from previously filtered liquid, the particulate material having a specific gravity of less than about 1.55, by the steps of transferring the particulate material in admixture with liquid from the location of said bed to an external location, admixing the particulate material with relatively clean liquid while draining off liquid and accumulated dirt from said particulate material, retaining sufficient liquid in admixture with said particulate material to render said material flowable, flowing said material and said sufficient liquid to the location of said bed, and finally removing said sufficient liquid to reform said bed.

13. A filter apparatus including a cartridge comprising two stationary perforate members one enclosing the other spaced apart from each other for confining a filter medium between the same, a filter medium of fine particulate material contained and confined by said perforate members in said space therebetween, and at least one perforate tube embedded in said filter medium providing a means for distributing backwash liquid for flow into and through said filter medium, said apparatus further including means for supplying liquid to be filtered to one side of said filter medium, means for withdrawing filtered liquid from the other side of said filter medium, means for supplying backwash liquid to said perforate tube for flow from said tube into said filter medium and means for withdrawing backwash liquid from said filter medium.

14. The filter apparatus of claim 13 in which the particles of said filter medium have an average size in the range from 35- —70 U.S. sieve number.

15. The filter apparatus of claim 13 in which said perforate tube extends parallel to said perforate members.

16. A filter apparatus including a cartridge comprising inner and outer stationary perforate tubular members disposed concentrically to define an annular space between the same, an annular body defining a filter medium and composed of fine particulate material contained and confined by said tubular members in said annular space therebetween, and at least one perforate tube embedded in said filter medium providing a means for distributing backwash liquid for flow into and through said filter medium, said apparatus further including means for supplying liquid to be filtered to the exterior surface of said outer tubular member, means for withdrawing filtered liquid from the interior of said inner tubular member, means for supplying backwash liquid to said perforate tube for flow from said tube into said filter medium and means for withdrawing backwash liquid from said filter medium.

17. The filter apparatus of claim 16 wherein said perforate tube for distributing backwash liquid extends substantially parallel to a common axis of said inner and outer perforate tubular members.

18. The filter apparatus of claim 17 including means for moving said perforate tube.

19. The filter apparatus of claim 16 including control means comprising solenoid-operated valve means providing an open supply passage to the exterior of said filter medium and an open withdrawal passage from the interior of said inner tubular member during the filtering portion of a cycle of filter operation, said control means including further solenoid operated valve means providing closed passages for said backwash supply and backwash withdrawal means during said filtering portion of said cycle and opening the latter passages automatically during a backwash portion of said cycle.

20. A filter apparatus including a cartridge comprising inner and outer perforate tubular members disposed concentrically to define an annular space between the same, an annular filter medium of fine particulate material contained and confined by said tubular members in said annular space therebetween, the particles of said filter medium ranging in size from 0.2 millimeters to 0.5 millimeters, and a plurality of perforate tubes embedded in said filter medium and each extending parallel to the common axis of said tubular members, said tubes providing a means for distributing backwash liquid through said filter medium, means supporting said tubes for rotation, said filter apparatus further including drive means coupled to said tubes for rotating the same, means for supplying liquid to be filtered to the exterior surface of said outer tubular member, means for withdrawing filtered liquid from the interior of said inner tubular member, means for supplying backwash liquid to said perforate tubes, and means for withdrawing backwash liquid from said filter medium.

21. A method of filtering comprising confining a finely divided annular particulate filter medium between two concentric perforate retainer members on opposite sides of the filter medium, passing contaminated liquid from one of said retainer members to the other for flow radially through said filter medium under pressure to remove contaminants from said liquid, the pressure passage of said liquid and the removed contaminants incidentally compacting said filter medium and ultimately clogging the same, distributing a backwash liquid throughout said filter medium by introducing the backwash liquid into said annular filter medium through at least one perforate tube embedded in said filter medium, said tube being interposed between said retainer members and extending parallel to the axis of said annular medium, and withdrawing backwash liquid through at least one of said concentric retainer members, so that said backwash liquid passes essentially radially throughout said annular filter medium and exits at the periphery of said annular medium to break up the compactness of said medium and to remove contaminants accreted on said filter medium while the medium is still confined between said members thereby renewing said medium for further filtration.

22. The method of claim 21 further including the step of traversing said filter medium with liquid and gas in the distribution of backwash liquid throughout said filter medium.

23. A filter apparatus including a cartridge comprising inner and outer perforate tubular members disposed concentrically to define an annular space between the same, an annular body defining a filter medium and composed of fine particulate material contained and confined by said tubular members in said annular space therebetween, and at least one perforate tube embedded in said filter medium and extending substantially parallel to a common axis of said inner and outer perforate tubular members, said perforate tube providing a means for distributing backwash liquid for flow into and through said filter medium, said apparatus further including means for rotating said perforate tube, means for supplying liquid to be filtered to the exterior of said outer tubular member, means for withdrawing filtered liquid from the interior of said inner tubular member, means for supplying backwash liquid to said perforate tube for flow from said tube into said filter medium, and means for withdrawing backwash liquid from said filter medium.

24. A filter apparatus including a cartridge comprising inner and outer perforate tubular members disposed concentrically to define an annular space between the same, an annular body defining a filter medium and composed of fine particulate material contained an confined by said tubular members in said annular space therebetween, and a plurality of perforate tubes embedded in said filter medium and extending parallel to a common axis of said tubular members, said tubes providing a means for distributing backwash liquid for flow into and through said filter medium, said apparatus further including means supporting said tubes for rotary movement, a common drive means for rotating said tubes simultaneously, means for supplying liquid to be filtered to the exterior surface of said outer tubular member, means for withdrawing filtered liquid from the interior of said inner tubular member, means for supplying backwash liquid to said perforate tubes for flow from said tubes into said filter medium and means for withdrawing backwash liquid from said filter medium.

25. A method of filtering comprising providing a filter bed consisting essentially of finely divided particles of a uniform material selected from the group consisting of polyethylene and polyvinyl chloride, said particles being generally spherical with pock-marked surfaces and having an average particle size in the range from about 0.25 to about 0.42 millimeters, and said bed having a porosity of about 60 percent to about 80 percent, passing contaminated liquid through said filter bed under pressure to remove contaminants from said liquid and to accrete the contaminants in said filter bed, the pressure passage of said liquid incidentally compacting said filter bed and ultimately clogging the same, mixing and agitating a backwash liquid with said filter bed to break up the compactness of said bed and to remove contaminants accreted in said bed, separating from said particles at least a portion of said backwash liquid with the contaminants suspended therein, and reforming said particles into said filter bed.

26. The method of claim 25 in which said particles consist essentially of polyvinyl chloride having a bulk density on the order of 25 pounds per cubic foot.